US010411928B2

(12) United States Patent
Yoo et al.

(10) Patent No.: US 10,411,928 B2
(45) Date of Patent: Sep. 10, 2019

(54) DYNAMIC CYCLIC PREFIX (CP) LENGTH

(71) Applicant: QUALCOMM Incorporated, San Diego, CA (US)

(72) Inventors: Taesang Yoo, Riverside, CA (US); Dinkar Vasudevan, San Diego, CA (US); Jing Sun, San Diego, CA (US); Xiaoxia Zhang, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 15/294,531

(22) Filed: Oct. 14, 2016

(65) Prior Publication Data

US 2017/0244586 A1   Aug. 24, 2017

Related U.S. Application Data

(60) Provisional application No. 62/298,744, filed on Feb. 23, 2016.

(51) Int. Cl.
*H04W 24/10* (2009.01)
*H04W 74/04* (2009.01)
(Continued)

(52) U.S. Cl.
CPC ......... *H04L 27/2607* (2013.01); *H04W 24/10* (2013.01); *H04W 72/042* (2013.01); *H04W 74/0808* (2013.01)

(58) Field of Classification Search
CPC ............... H04W 24/10; H04W 72/042; H04W 74/0808
See application file for complete search history.

(56) References Cited

U.S. PATENT DOCUMENTS 8,422,577 B1    4/2013  Shetty et al.
2008/0032677 A1*  2/2008  Catovic ................. H04W 72/02
                                                    455/414.1
(Continued)

FOREIGN PATENT DOCUMENTS

FR           2932933 A1   12/2009
WO   WO-2009072171 A1   6/2009
(Continued)

OTHER PUBLICATIONS

International Search Report and Written Opinion—PCT/US2017/018459—ISA/EPO—dated Aug. 16, 2017.

*Primary Examiner* — Ronald B Abelson
(74) *Attorney, Agent, or Firm* — Loza & Loza, LLP

(57) ABSTRACT

Methods, systems, and devices for wireless communication are described. A wireless device may communicate using a dynamic cyclic prefix (CP) length to reduce communications overhead. That is, the wireless device may use a CP length that is changeable for each data packet or listen-before-talk (LBT) frame. For example, the wireless device may initially communicate using a first CP length and then receive a dynamic CP indication for subsequent symbols in one or more data packets or LBT frames. The wireless device may then communicate using the different CP length based on the indication. In some examples, the indicated dynamic CP length may be based on a cell radius of a base station, a data direction, or the location of a user equipment (UE) in relation to the base station.

22 Claims, 19 Drawing Sheets

(51) Int. Cl.
  *H04W 74/08*  (2009.01)
  *H04L 27/26*  (2006.01)
  *H04W 72/04*  (2009.01)

(56) References Cited

U.S. PATENT DOCUMENTS

| | | | |
|---|---|---|---|
| 2008/0084845 A1* | 4/2008 | Kuchibhotla | H04B 7/2656 370/331 |
| 2009/0122771 A1 | 5/2009 | Cai | |
| 2009/0270122 A1* | 10/2009 | Chmiel | H04J 11/0093 455/550.1 |
| 2009/0296645 A1 | 12/2009 | Bui | |
| 2012/0281551 A1* | 11/2012 | Alanara | H04L 27/2607 370/252 |
| 2013/0022090 A1* | 1/2013 | Weng | H04L 25/03343 375/219 |
| 2015/0023439 A1 | 1/2015 | Dimou et al. | |
| 2015/0201434 A1* | 7/2015 | Fang | H04W 74/0816 370/335 |
| 2015/0295743 A1* | 10/2015 | Hwang | H04W 48/12 370/280 |
| 2017/0127435 A1* | 5/2017 | Rong | H04W 72/12 |

FOREIGN PATENT DOCUMENTS

| | | | | |
|---|---|---|---|---|
| WO | WO 2010050731 | * | 5/2010 | H04B 7/26 |
| WO | WO-2010050731 A2 | | 5/2010 | |
| WO | WO-2014025157 A1 | | 2/2014 | |

* cited by examiner

DYNAMIC CYCLIC PREFIX (CP) LENGTH

PRIORITY CLAIM

This application claims priority to and the benefit of provisional patent application No. 62/298,744 filed in the United States Patent and Trademark Office on 23 Feb. 2016, the entire content of which is incorporated herein by reference as if fully set forth below in its entirety and for all applicable purposes.

TECHNICAL FIELD

The technology discussed below relates generally to wireless communication systems, and more particularly, to cyclic prefix length management in wireless communication.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

In an ideal case without any multipath, a wireless communication network that utilized orthogonal frequency division multiplexing (OFDM) would be able to transmit signals that were free from any interference from other subcarriers or tones, and from inter-symbol interference (ISI). However, in a real-world network having a multipath radio environment, orthogonality between the subcarriers may be partially lost. To help maintain orthogonality, many networks that utilize OFDM may sometimes utilize a cyclic prefix (CP) to mitigate the ISI from multipath communication. In some examples, a network may implement a CP by copying the tail of each OFDM symbol and pasting it onto the front of the symbol.

Some systems may use a longer CP duration to mitigate inter symbol interference (ISI) in a scenario where there is greater delay spread, particularly for wireless devices found near the outer boundary of a relatively large cell. However, the use of a longer CP duration may result in excess overhead and inefficient resource utilization, particularly for wireless devices that are not located near a cell boundary.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

A wireless device may communicate using a dynamic cyclic prefix (CP) length to reduce communications overhead. In one aspect of the disclosure, the wireless device may use a CP length that is changeable on a per-data packet or per-listen-before-talk (LBT) frame basis. For example, the wireless device may initially communicate using a first CP length and then receive a dynamic CP indication for subsequent symbols in one or more data packets or LBT frames. The data packets may be upper protocol packets such as IP packets. The wireless device may then communicate using the different CP length based on the indication. In some examples, the indicated dynamic CP length may be based on a cell radius of a base station, the location of a user equipment (UE) in relation to the base station, or a signal condition.

One aspect of the present disclosure provides a method of wireless communication. The method may include communicating with a wireless device using a signal with a first CP length, receiving a dynamic CP indication in each of a predetermined number of data packets from the wireless device, and communicating with the wireless device using the signal with a second CP length based at least in part on the dynamic CP indication. The second CP length may be based at least in part on a signal condition or a data direction of the signal.

Another aspects of the present disclosure provides an apparatus for wireless communication. The apparatus may include means for communicating with a wireless device using a signal with a first CP length, means for receiving a dynamic CP indication in each of a predetermined number of data packets, and means for communicating with the wireless device using the signal with a second CP length based at least in part on the dynamic CP indication.

Another aspect of the present disclosure provides an apparatus for wireless communication. The apparatus may include a processor, a memory in communication with the processor, and instructions stored in the memory. The instructions may be operable to cause the processor to communicate with a wireless device using a signal with a first CP length, receive a dynamic CP indication in each of a predetermined number of data packets, and communicate with the wireless device using the signal with a second CP length based at least in part on the dynamic CP indication.

Another aspect of the present disclosure provides a non-transitory computer readable medium for wireless communication. The non-transitory computer-readable medium may include instructions to cause a processor to communicate with a wireless device using a signal with a first CP length, receive a dynamic CP indication in each of a predetermined number of data packets, and communicate with the wireless device using the signal with a second CP length based on the dynamic CP indication.

In some examples of the method, apparatus, or non-transitory computer-readable medium described above, communicating with the wireless device using the second CP length comprises communicating on an unlicensed radio frequency (RF) spectrum band during a listen-before-talk (LBT) frame, and where the dynamic CP indication corresponds to the LBT frame. In some examples of the method, apparatus, or non-transitory computer-readable medium described above, communicating with the wireless device using the second CP length comprises communicating using the second CP length during a transmission period of a data packet, and where the dynamic CP indication corresponds to the data packet.

In some examples of the method, apparatus, or non-transitory computer-readable medium described above, communicating with the wireless device using the first CP length comprises receiving a control channel message for the data packet. In some examples of the method, apparatus, or non-transitory computer-readable medium described above, each data packet communicated with the wireless device is associated with an individual dynamic CP indication.

In some examples of the method, apparatus, or non-transitory computer-readable medium described above, the first CP length is based on a cell radius of a base station and the second CP length is based on a location of the wireless device relative to the base station. In some examples of the method, apparatus, or non-transitory computer-readable medium described above, the transmission comprises a control channel transmission, a frame format indicator channel (PFFICH) transmission, a physical control format indicator channel (PCFICH) transmission, a physical downlink control channel (PDCCH) transmission, an uplink (UL) grant, or a downlink (DL) grant.

In some examples of the method, apparatus, or non-transitory computer-readable medium described above, the transmission comprises a reference signal. Some examples of the method, apparatus, or non-transitory computer-readable medium described above may further include processes, features, means, or instructions for performing a descrambling procedure on the transmission. Some examples of the method, apparatus, or non-transitory computer-readable medium described above may further include processes, features, means, or instructions for identifying the second CP length based on the descrambling procedure.

Some examples of the method, apparatus, or non-transitory computer-readable medium described above may further include processes, features, means, or instructions for performing a blind CP detection based on the second CP length or a time gap between adjacent OFDM symbols. In some examples of the method, apparatus, or non-transitory computer-readable medium described above, communicating with the wireless device using the second CP length comprises communicating using the second CP length during a next subframe or a next orthogonal frequency division multiplexing (OFDM) symbol following the transmission.

Some examples of the method, apparatus, or non-transitory computer-readable medium described above may further include processes, features, means, or instructions for configuring a CP length for each of a set of UEs, where the wireless device comprises one of the set of UEs. In some examples of the method, apparatus, or non-transitory computer-readable medium described above, the CP length for each of the set of UEs is based on an UL channel measurement for each of the set of UEs.

Some examples of the method, apparatus, or non-transitory computer-readable medium described above may further include processes, features, means, or instructions for receiving an indication of the first CP length, where the first CP length comprises a default CP length. Some examples of the method, apparatus, or non-transitory computer-readable medium described above may further include processes, features, means, or instructions for transmitting a CP length request to a base station, where the second CP length is based on the CP length request.

In some examples of the method, apparatus, or non-transitory computer-readable medium described above, the CP length request is based on a DL channel measurement. Some examples of the method, apparatus, or non-transitory computer-readable medium described above may further include processes, features, means, or instructions for configuring a semi-static CP length for each of a set of UEs, where the wireless device comprises one of the set of UEs.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
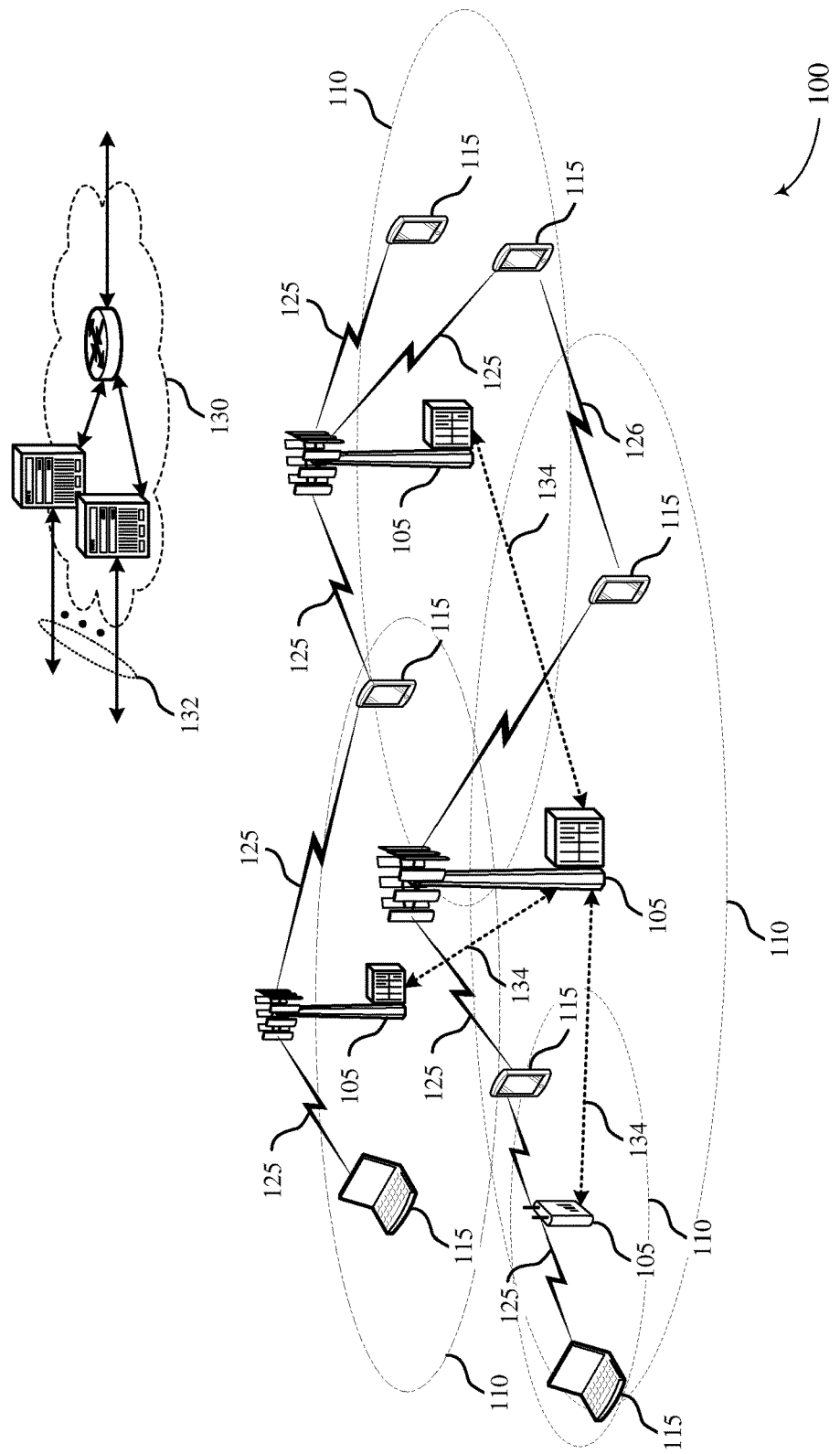
FIG. 1 illustrates an example of a wireless communications system that supports dynamic CP length in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In some examples, a wireless network may choose a static cyclic prefix (CP) length for a cell during initial cell deployment. The selected CP may be based on factors such as cell size. For example, a first CP length (e.g., a normal CP with a duration of 4.7 µs or 0.9 µs) or a second CP length (e.g., an extended CP with a duration of 16.7 µs or 3.3 µs) may be used depending on the radius of the cell, where small cells and large cells may be configured with shorter and longer CP durations, respectively. In some examples, the CP length may be a cell-specific parameter where an indicated CP length for the cell may not change dynamically on a per-packet basis.

However, a static CP length may result in an inefficient use of resources. That is, using the same CP length for different multipath delay spreads (e.g., different user equipment (UE) locations within the cell) may result in UEs with a shorter duration delay spread (e.g., UEs closer to the cell center) using a CP that is longer than necessary. In some examples, using a longer CP for communications to all wireless devices in a cell may result in unnecessary overhead.

In some aspects of the present disclosure, a CP length may be dynamically indicated in each packet or listen-before-talk (LBT) frame to increase communication efficiency and reduce overhead. In some examples, the packet may be an upper protocol layer packet (e.g., IP packets). An LBT frame may be used in an LBT procedure to determine whether the channel is available. In the LBT frame, a wireless device (e.g., a UE) monitors or senses its radio environment before it starts a transmission. A dynamic CP indication received by a wireless device may be explicit or implicit. That is, the dynamic CP indication may be explicitly signaled in control signals or may be implicitly derived from cell-specific reference signal (CRS) scrambling, control channel scrambling, a subframe number, etc.

In some examples, a CP indicated by a base station may be used for uplink transmissions by UEs in the same LBT frame when communicating in unlicensed spectrum. The determination of a CP length may be based on observed channel delay spread by a base station or a UE. The base station may determine the CP length to be used for each UE based on the channel delay spread observed on the uplink channel. Alternatively, the UE may suggest a CP length to the base station based on the delay spread observed on the downlink channel. A UE-specific indication of CP length may also be used, where UE-specific signaling of CP length may be valid in the data region of the packet.

In some cases, a UE or base station may operate in a shared or unlicensed frequency spectrum. These devices may perform an LBT procedure such as a clear channel assessment (CCA) prior to communicating in order to determine whether the channel is available. A CCA may include an energy detection procedure to determine whether there are any other active transmissions. For example, the device may infer that a change in a received signal strength indicator (RSSI) (or other signal power indicators) indicates that a channel is occupied. Specifically, signal power that is concentrated in a certain bandwidth and exceeds a predetermined noise floor or level may indicate another wireless transmitter using the spectrum or channel. A CCA may also include detection of specific sequences that indicate use of the channel. For example, another device may transmit a specific preamble prior to transmitting a data sequence.

Aspects of the disclosure are initially described in the context of a wireless communication system. Specific examples are then described for wireless devices communicating using dynamic CP lengths configurations. Aspects of the disclosure are further illustrated by and described with reference to apparatus diagrams, system diagrams, and flowcharts that relate to dynamic CP length.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communications system 100 may support the use of a CP length that is dynamically configurable for specific data packets or LBT frames.

In some examples, access to the air interface may be scheduled, wherein a scheduling entity (e.g., a base station) allocates resources for communication among some or all devices and equipment (UEs) within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity (e.g., a base station).

Base stations are not the only entities that may function as a scheduling entity. That is, in some examples, a UE 115 may function as a scheduling entity, scheduling resources for one or more scheduled entities (e.g., one or more other UEs). In other examples, sidelink signals 126 may be used between UEs without necessarily relying on scheduling or control information from a base station. In some examples, a UE 115 may function as a scheduling entity or a primary sidelink device, and another UE 115 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, two UEs may optionally communicate directly with one another in addition to communicating with the scheduling entity (e.g., a base station).

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a CP length. In some examples, the base station 105 may use other signals or channels to communicate the CP length.

A wireless device, such as a UE 115 or base station 105, may use different CP lengths depending on the deployment scenario of wireless communications system 100, such as a cell size and/or delay spread. For example, a first CP length (e.g., a normal CP with a duration of 4.7 µs or 0.9 µs) and a second CP length (e.g., an extended CP with a duration of 16.7 µs or 3.3 µs) may be used depending on the radius of the cell. Small cells may be configured with a normal CP, and large cells may be configured with an extended CP. In some cases, a base station 105 may transmit an indication of CP length to a UE 115 via a synchronization signal (e.g., PSS, SSS, etc.), and the indicated CP may be applicable for both uplink and downlink transmission, where the CP length may be the same for both uplink and downlink. In some cases, the CP length may be a cell-specific parameter, where the CP length indicated for the cell may not change dynamically on a per-packet, subframe, or TTI basis.

However, cell-specific or non-dynamic CP lengths may result in an inefficient use of resources. That is, using the same CP length for different multipath delay spreads (e.g., different UE locations within the cell) may result in wireless devices with a shorter duration delay spread (e.g., UEs 115 closer to the center of the cell) using a CP that is longer than necessary. In some cases, using a longer CP for both cell-center and cell-edge UEs 115 may incur additional and unnecessary overhead. As an example, a large cell may use an extended CP to serve cell-edge UEs 115, but a CP with a shorter duration may be sufficient to serve cell-center UEs 115.

In some cases, different CP lengths may be used based on the multipath propagation or delay spread experienced by a wireless device. Multipath propagation may be caused by different copies of a wireless signal reaching a receiver via different paths with varying path lengths. The different path lengths may be based on, for example, atmospheric reflection and refraction, or reflection from buildings, water, and other surfaces. Multipath propagation may result in a time delay (or a phase shift) for one copy of a signal, which causes constructive or destructive interference (between consecutive symbols, inter-symbol interference (ISI), or within a single symbol). A guard interval (GI) (which may include a cyclic prefix) may be prepended to transmissions to mitigate the effects of channel spreading caused by multipath propagation.

A frame structure may be used to organize physical resources (e.g., time-frequency resources). For example, in FIG. 2, a frame may be a 10 ms interval that may be further divided into 10 equally sized sub-frames 200. Each sub-frame may include two consecutive time slots. Each slot may include 6 or 7 OFDM symbol periods. A resource element (RE) 202 may consist of one symbol period and one subcarrier (e.g., a 15 KHz frequency range or carrier). A resource block (RB) may contain 12 consecutive subcarriers in the frequency domain and, for a normal CP in each OFDM symbol, 7 consecutive OFDM symbols in the time domain (1 slot), or 84 REs. Some REs 204 may include DL reference signals (DL-RS). The DL-RS may include a cell-specific reference signal (CRS) and a UE-specific RS (UE-RS). UE-RS may be transmitted on the RBs associated with physical downlink shared channel (PDSCH). The number of bits carried by each RE may depend on the modulation scheme (the configuration of symbols that may be selected during each symbol period). Thus, the more RBs that a UE receives and the higher the modulation scheme, the higher the data rate may be.

Figure 2:
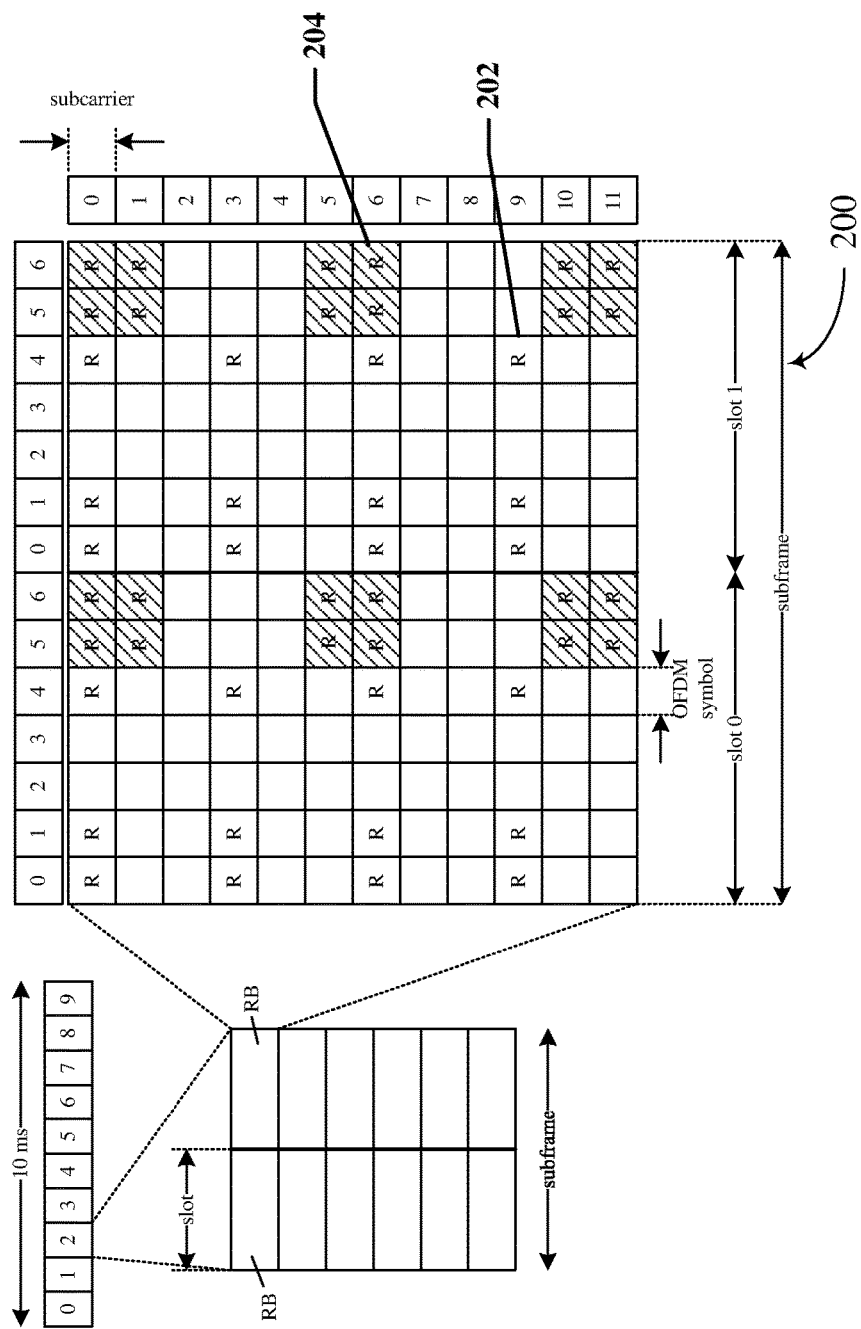
FIG. 2 illustrates an example of a physical resource grid in accordance with aspects of the present disclosure.

In some aspects of the disclosure, the subframe 200 of FIG. 2 may be configured for UL or sidelink communications in addition to DL communication. When used as a UL subframe, the subframe 200 may include various UL control signals and reference signals. When used as a sidelink subframe, the subframe 200 may include sidelink control signals (e.g., handshaking signals). In some examples, the subframe 200 may be used in the dynamic CP schemes described in relation to FIGS. 4-7. In some examples, the subframe 200 may be used in the dynamic CP processes described in relation to FIGS. 8A-8C. In some examples, the subframe 200 may be used in the methods described in relation to FIGS. 14-17.

Thus, according to some aspects of the disclosure, a wireless device (such as UE 115 or base station 105) may communicate using a dynamic cyclic prefix (CP) length to reduce communications overhead. That is, the wireless device may use a CP length that may dynamically change for each data packet or listen-before-talk (LBT) frame that is communicated. For example, the wireless device may initially communicate using a first CP length (which may be indicated via PSS and SSS) and receive a control message including a dynamic CP indication that indicates a different CP length associated with subsequent data packets (or LBT frames). The wireless device may then communicate using the different CP length based on the received indication. In some examples, the first CP length may be based on a cell radius of a base station 105, and the indicated dynamic CP length may be based on the location of a UE 115 in relation to the base station 105.

Figure 3:
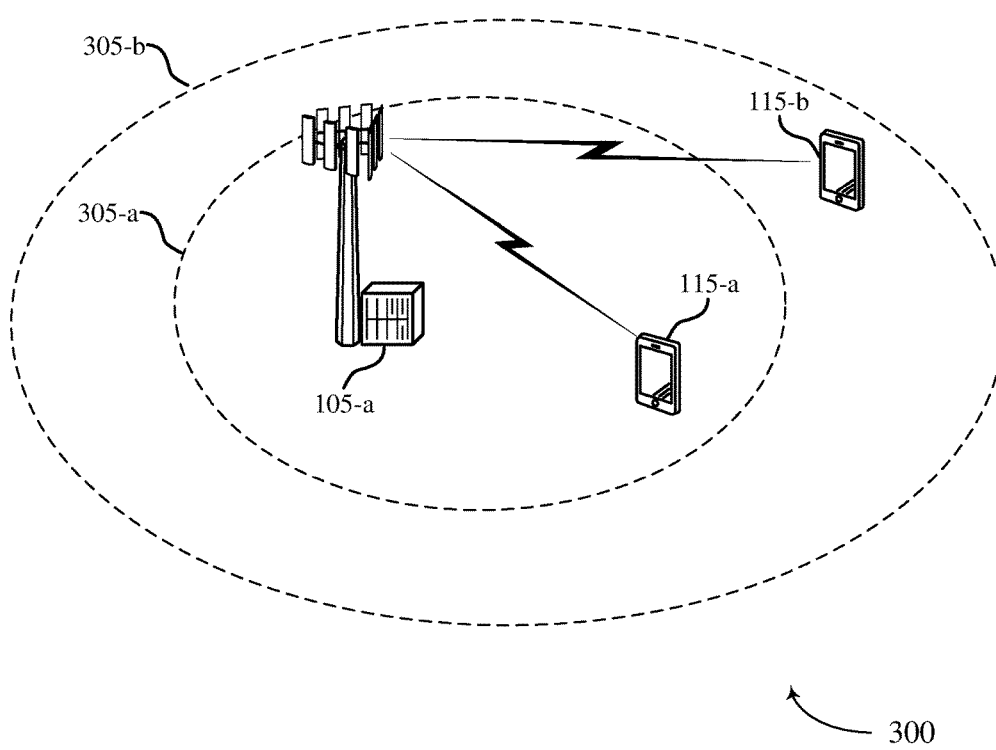
FIG. 3 illustrates an example of a wireless communications system that supports dynamic CP length in accordance with aspects of the present disclosure.

FIG. 3 illustrates an example of a wireless communications system 300 for dynamic CP length. Wireless communications system 300 may include base station 105-*a* and UE 115-*a*, which may be examples of the corresponding devices described with reference to FIG. 1. Wireless communications system 300 may support the use of dynamic CP lengths by wireless devices.

Wireless communications system 300 may use a CP length that is dynamically indicated in each packet or LBT frame to increase communication efficiency and/or reduce overhead. In some examples, the CP length may be indicated in certain predetermined packets or LBT frames as needed or based on certain conditions such that the CP length may be changed dynamically while the communication is ongoing. The dynamic CP indication may be explicit or implicit. That is, the dynamic CP indication may be explicitly signaled in control signals or may be implicitly derived from common reference signal (CRS) scrambling, control channel scrambling, subframe number, etc. Some non-limiting examples of control signals are physical frame format indicator (PFFICH), physical control format indicator (PCFICH), downlink grant, uplink grant, etc.

In one example, a per-packet CP length indication may be transmitted via control signaling in each packet or LBT frame, and the dynamically indicated CP length may be valid for the rest of the packet or a predetermined number of packets. Additionally or alternatively, a semi-static indication of a default CP length may be indicated via PSS/SSS, physical broadcast channel (PBCH), or by other means. A semi-static indication of CP length does not change frequently (e.g., not pre-packet or pre-TTI). In some cases, the beginning portion of a packet or frame, including OFDM symbols carrying the control signaling, may use the default CP length. The dynamic CP may be applied beginning at the next OFDM symbol, or may be applied beginning at the next subframe.

In some cases, large cells may be configured for use with a first CP (e.g., an extended CP) in addition to a per-packet dynamic indication of CP length. For example, a large cell may be configured with a first CP (e.g., an extended CP) for large multipath delay spreads associated with packets destined for UEs 115 located at a relatively large radius from the cell center (e.g., within a longer CP coverage area 305-b), but may be capable of configuring a dynamic CP length for packets destined for a cell-center UE 115-a located at a smaller radius (e.g., within a shorter CP coverage area 305-a). Packets destined for a cell-edge UE 115-b or a mix of cell-center and cell-edge UEs 115 may continue to be configured with the first CP. Packets serving cell-center UE 115-a may contain a CP indicating OFDM symbol (e.g., a CP indicator) that carries CP information for the packet. The CP length may switch to a second CP (e.g., a normal CP) starting from the OFDM symbol after the CP indicating OFDM symbol.

In some examples, a first CP (e.g., a normal CP) may be used as the default CP length despite a relatively large cell size, and a dynamic CP (e.g., an extended CP) may be indicated to cell-edge UEs 115 or UEs suffering large multi-path delay spread. In such cases, cell-edge UE 115-b may suffer from inter symbol interference (ISI) for the beginning portion of a packet, but may be able to tolerate the ISI during control channel decoding. In some cases, the UE 115-b may transmit measurement information to the base station 105-a, and the base station 105-a may determine the CP length for the UE 115-b based on the received measurement information. In one example, the measurement information may include a delay spread of a transmission. In another example, the measurement information may include a decoding error due to ISI. Packets for serving the cell-edge UE 115-b, or for a mix of cell-center and cell-edge UEs 115, may contain a CP indicating OFDM symbol (a CP indicator) that carries CP information for the packet. For example, the CP indicating OFDM symbol may be configured to indicate a CP length explicitly or an increase/decrease of the CP length. The CP length may then switch to the second CP starting from the OFDM symbol after the CP indicating OFDM symbol. Packets exclusively serving cell-center UE 115-a may continue to be configured with the first CP.

In some examples, a CP indicated by the base station 105-a may be used for uplink transmissions by UEs 115 in the same LBT frame when communicating in unlicensed spectrum. In such cases, the CP indication may be a per-packet or per-LBT frame dynamic indication of CP length. For example, packets serving a cell-edge UE 115-b, or a mix of cell-center and cell-edge UEs 115, may indicate an extended CP for uplink transmission. Packets serving a cell-center UE 115-a may indicate CP information for an LBT frame in an OFDM symbol, and a second (normal) CP may be used for uplink transmissions in this case.

The determination of a CP length may be based on an observed channel delay spread by a base station 105-a or a UE 115 (such as cell-center UE 115-a or cell-edge UE 115-b). The base station 105-a may determine the CP length to be used for each UE 115 based on the channel delay spread observed on the uplink channel. Therefore, different CP lengths may be used for different UEs. Alternatively, a UE 115-a or UE 115-b may suggest a delay spread to the base station based on the delay spread observed on the downlink channel. For example, the UE 115-a or UE 115-b may send an indication to the base station 105-a that it is capable of using a dynamic CP length, and may also send an indication requesting or suggesting a different CP length.

In some examples, a UE-specific indication of CP length may also be used, for example, in the data region of the packet. Common pilots and control region may use the default CP length. In general, a packet has the common pilots and control region in the beginning portion followed by the data region. The UE-specific indication of CP length may reduce the need for CP length signaling per packet.

In some aspects of the disclosure, there may be a per-packet indication of CP length in each packet without the presence of a default CP length. Additionally or alternatively, the CP length may be indicated in every packet or LBT frame, for example, based on a measured delay spread, ISI, or other factors. The dynamically indicated CP length may be valid for the entire packet, and the CP information may be carried at the beginning of the packet (e.g., via CP-dependent scrambling of cell-specific reference signal (CRS)).

Figure 4:
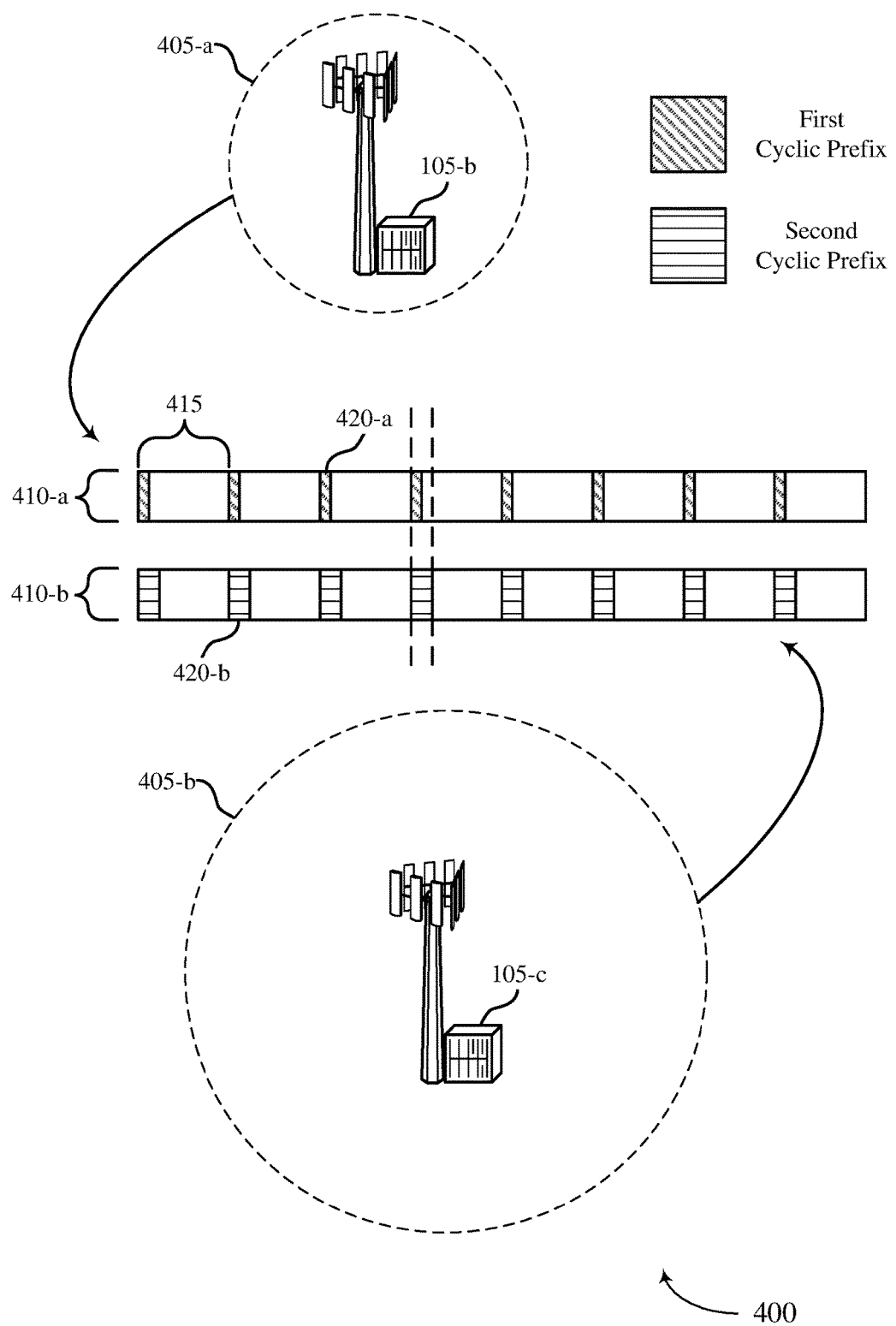
FIG. 4 illustrates an example of a CP scheme in a system that supports semi-static CP length in accordance with aspects of the present disclosure.

FIG. 4 illustrates an example of a CP scheme 400 in a system that supports semi-static CP length. In some cases, the CP scheme 400 may represent aspects of techniques performed by a UE 115 or a base station 105 as described with reference to FIGS. 1 and 3. The CP scheme 400 illustrates an example in which different base stations 105 serve cells with different coverage areas 405.

For example, a first base station 105-b may serve a first coverage area 405-a, and a second base station 105-c may serve a second coverage area 405-b that is larger than the first coverage area 405-a. A first cell configuration 410-a may serve the UEs 115 inside the first coverage area 405-a and may contain symbol periods 415 (e.g., OFDM symbol periods) configured with a first CP 420-a (e.g., a normal CP). A second cell configuration 410-b for serving UEs 115 inside the second coverage area 405-b may contain symbol periods 415 that are configured with a second CP 420-b (e.g., an extended CP), where the second CP 420-b has a longer duration than the first CP 420-a. In some cases, the second base station 105-c may configure a UE 115 with a reduced symbol period when the UE 115 is near the cell center (not shown, but see FIG. 5 through 7). The CP lengths of the CP scheme 400 are semi-static because they do not change dynamically or frequently (e.g., not changing per-packet or TTI). In this example, the first base station 105-b uses a normal CP length for the UEs in its coverage area, while the second base station 105-c uses an extended CP for the UEs in its coverage area.

Figure 5:
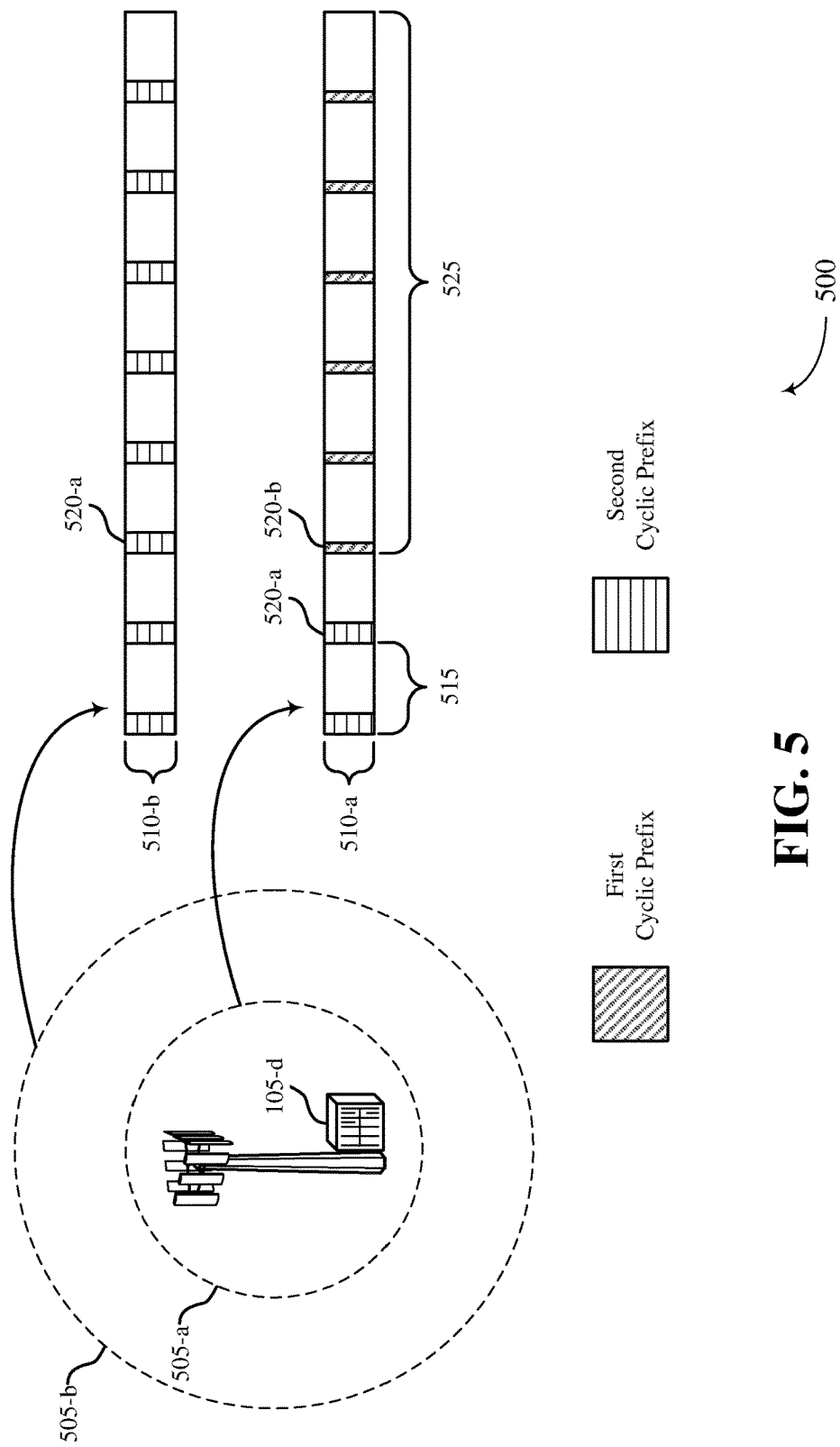
FIGS. 5 through 7 illustrate examples of CP schemes in a system that supports dynamic CP length in accordance with aspects of the present disclosure.

FIG. 5 illustrates an example of a CP scheme 500 in a system that supports dynamic CP length. In some cases, CP scheme 500 may represent aspects of techniques performed by a UE 115 or base station 105 as described with reference to FIGS. 1-2. CP scheme 500 illustrates an example in which a base station 105-d switches communications with UEs 115 near the cell center from using a first CP length to a second CP length, for example, to mitigate ISI.

Base station 105-*d* may communicate with multiple UEs 115 (not shown in FIG. 5) located in an inner coverage area 505-*a*, an outer coverage area 505-*b*, or both, using a dynamic indication of CP lengths. For example, a base station 105-*d* may serve UEs 115 located within the inner coverage area 505-*a* using an inner cell configuration 510-*a*. The inner cell configuration 510-*a* may include symbol periods 515 (e.g., OFDM symbol periods) configured with a first CP 520-*a*. (e.g., an extended CP). In some cases, the first CP 520-*a* is used based on a dynamic CP indication. In some examples, the first CP 520-*a* may be designated as a default CP for communication.

In some cases, a dynamic CP indication may be received that directs a switch from the first CP 520-*a* to a second CP 520-*b* (e.g., a normal CP). That is, the second CP 520-*b* may be shorter than the first CP 520-*a*. In some cases, the second CP 520-*b* may be applied to all symbol periods 515 for a time duration 525, which may correspond to a packet transmission, an LBT frame, or a TTI. For example, a UE 115 may switch from using the first CP 520-*a* to the second CP 520-*b* when the UE moves from the outer coverage area 505-*b* toward the inner coverage area 505-*a*. In another example, a UE 115 may switch from using the first CP 520-*a* to the second CP 520-*b* when the UE experiences less multipath delay spread. In other cases, the second CP 520-*b* indicated by the dynamic CP indication may be applied starting on a next subframe (not shown). Additionally, a base station 105-*d* may use the outer cell configuration 510-*b* to serve cell-edge UEs 115 or UEs 115 associated with large multipath delay spreads (e.g., UEs 115 within the outer coverage area 505-*b*, and outside of the inner coverage area 505-*a*).

According to the outer cell configuration 510-*b*, the first CP 520-*a* may be included within each symbol period 515. The outer cell configuration 510-*b* may continue using the first CP 520-*a* (e.g., an extended CP) to account for multipath reception issues associated with UEs located at a larger radius from the cell center.

Figure 6:
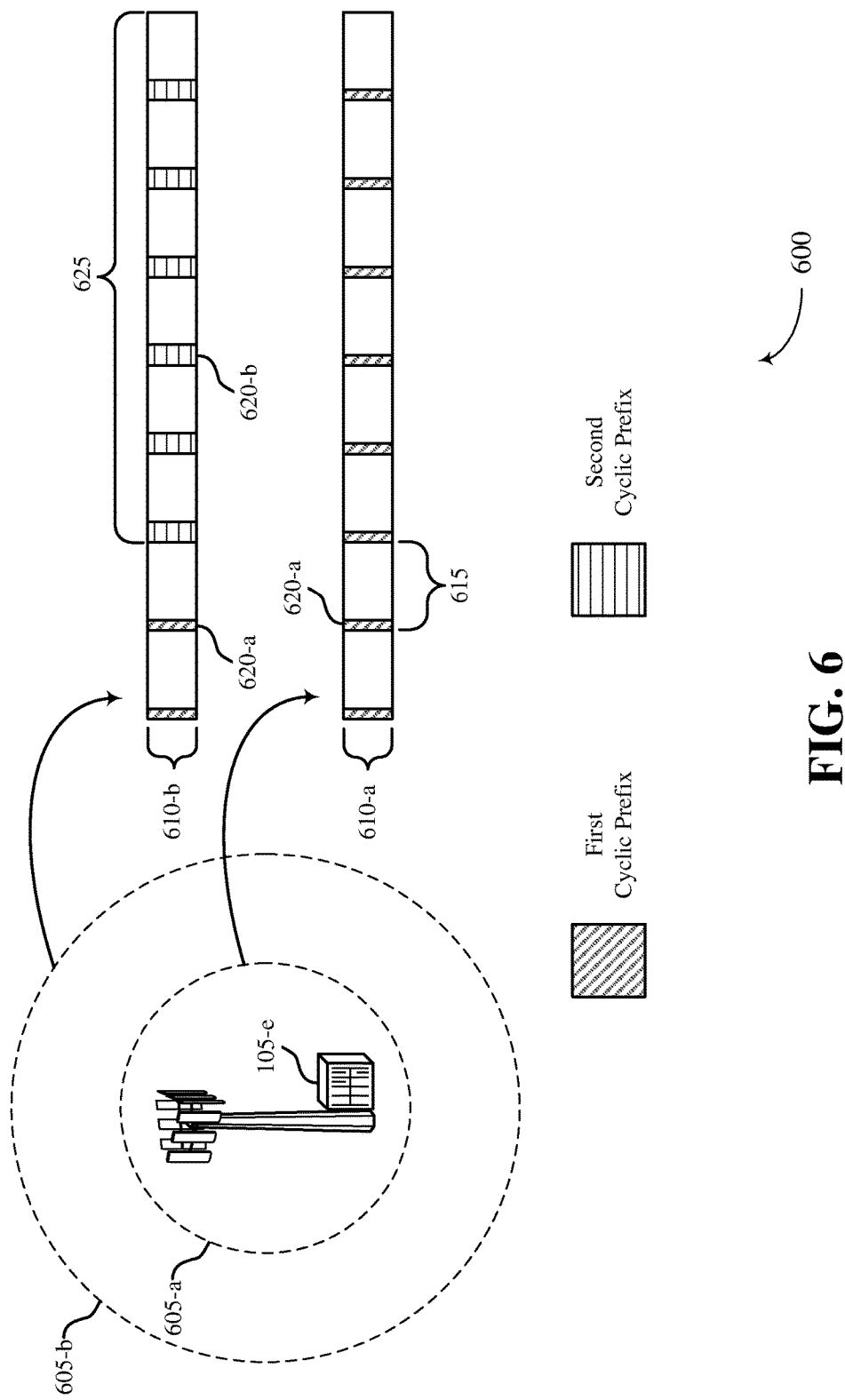

FIG. 6 illustrates an example of a CP scheme 600 in a system that supports dynamic CP length. In some cases, the CP scheme 600 may represent aspects of techniques performed by a UE 115 or base station 105 as described with reference to FIGS. 1-3. The CP scheme 600 illustrates an example in which a base station 105-*e* switches communications with UEs 115 near the cell edge from using a first CP length to a second CP length.

The base station 105-*e* may communicate with multiple UEs 115 (not shown in FIG. 6) located within an inner coverage area 605-*a* and an outer coverage area 605-*b*. The base station 105-*d* may use an inner cell configuration 610-*a* to communicate with the UEs 115 located within the inner coverage area 605-*a*. The inner cell configuration 610-*a* may include symbol periods 615 configured with a first CP 620-*a* (e.g., a normal CP). In some cases, the first CP 620-*a* may be designated as a default CP. The outer cell configuration 610-*b* may be used to serve cell-edge UEs 115, or a mix of cell-edge and cell-center UEs 115, and may contain symbol periods 615 that are configured with a first CP 620-*a*.

In some cases, a UE 115 using the outer cell configuration 610-*b* may then switch to symbol periods 615 based on a second CP 620-*b* (e.g., an extended CP). In some cases, an indication of a switch to the second CP 620-*b* length may be based on a determination that the outer cell configuration 610-*b* serves UEs 115 located at a radius associated with larger multipath delay spreads (e.g., if a channel quality metric goes below some threshold, or if the UE 115 requests a longer CP). For example, the UEs 115 may move from the inner coverage area 605-*a* toward the outer coverage area 605-*b*.

In some cases, the second CP 620-*b* may be applied for a time duration 625, which may correspond to the duration of a packet, TTI, or LBT frame. In other cases, the second CP 620-*b* indicated by the dynamic CP indication may be applied at the beginning of a next subframe (not shown).

In some examples, a UE 115 located in the outer coverage area 605-*b* may be subject to ISI while using the first CP 620-*a* prior to switching to the second CP 620-*b*. In such cases, initially using the first CP 620-*a* before switching to the second CP 620-*b* (where the first CP 620-*a* is shorter than the second CP 620-*b*) may be desirable when a time duration prior to the time duration 625 carries only control information, and data is carried during the time duration 625. It is because control channels may still be decoded in the presence of ISI when using the shorter CP 620-*a*, as they may not require as high a signal-to-noise ratio (SNR) for decoding as the data in the time duration 625.

Figure 7:
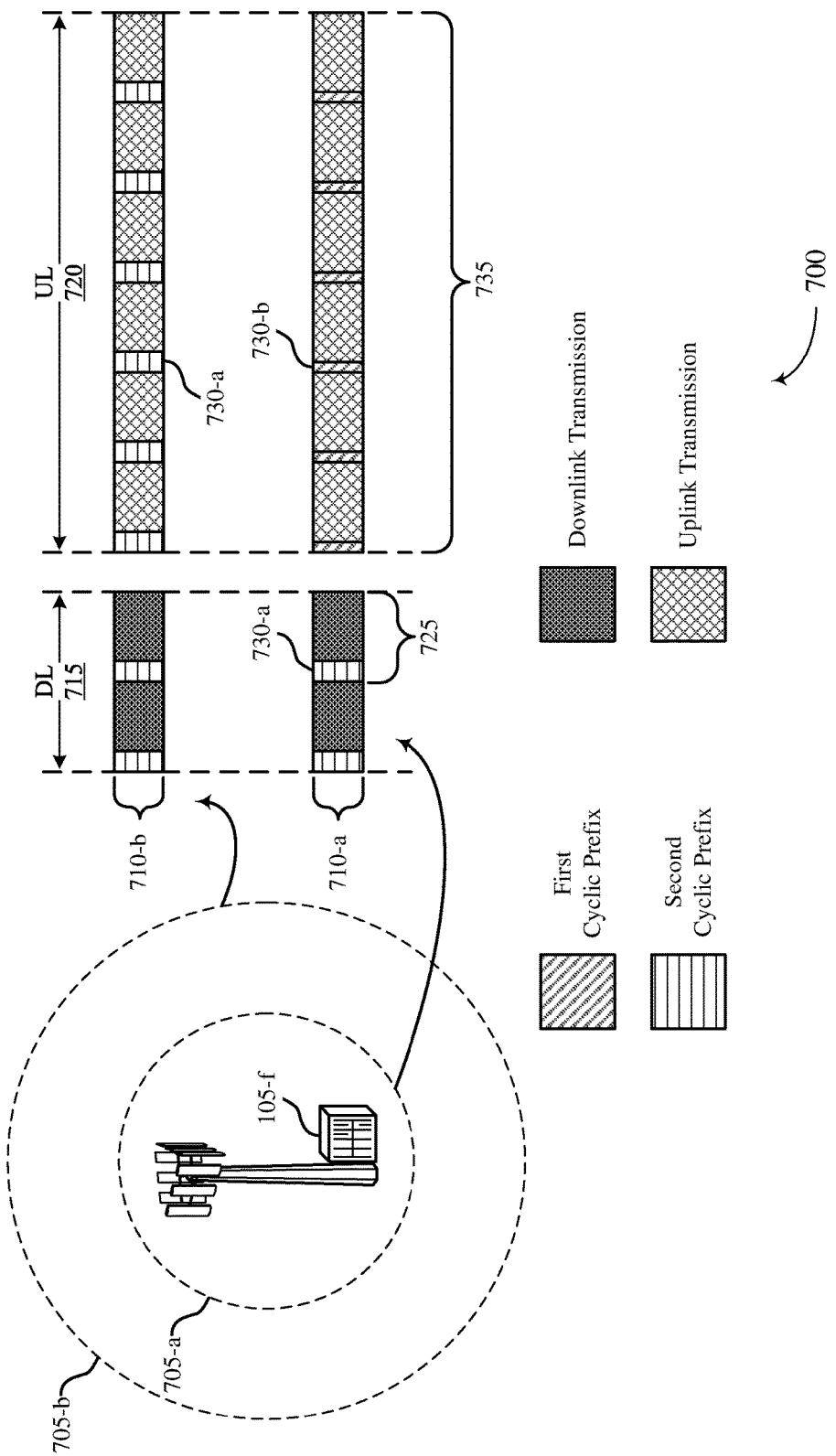

FIG. 7 illustrates an example of a CP scheme 700 in a system that supports dynamic CP length. In some cases, the CP scheme 700 may represent aspects of techniques performed by a UE 115 or base station 105 as described with reference to FIGS. 1-3. The CP scheme 700 illustrates an example in which a base station 105 switches communications with UEs 115 near the cell center from using a first CP length during DL communications to a second CP length during UL communications.

In some examples, a base station 105-*f* may communicate with UEs 115 (not shown in FIG. 7) in an inner coverage area 705-*a* (using an inner cell configuration 710-*a*) and an outer coverage area 705-*b* (using an outer cell configuration 710-*b*). The base station 105-*f* may send a dynamic CP indication during a downlink time period 715 to indicate a CP length to be used by one or more UEs 115 during an uplink time period 720.

In some cases, the inner cell configuration 710-*a* may contain symbol periods 725 in the downlink time period 715 that are configured with a first CP 730-*a* (e.g., an extended CP). In some cases, an indication of dynamic CP length may be included within each symbol period 725.

In some cases, the base station 105-*f* may transmit an implicit or explicit dynamic CP indication for a UE 115 to use a second CP 730-*b* during an uplink duration 720. The shorter second CP 703-*b* may be used in the UL because the UE is in the inner cell area. In some cases, only UEs 115 located within the inner coverage area 705-*a* may switch to the second CP 730-*b* (e.g., a normal or shorter CP). The second CP 730-*b* may be used for a time duration 735, which may correspond to a packet, a TTI, or an LBT frame.

The outer cell configuration 710-*b*, may serve cell-edge UEs 115, or a combination of cell-center UEs 115 and cell-edge UEs 115. Symbol periods 725 within the outer cell configuration 710-*b* may be configured with a first CP 730-*a* during the downlink time period 615, and transmissions during the uplink time period 720 may continue to use the first CP 730-*a*.

Figure 8A:
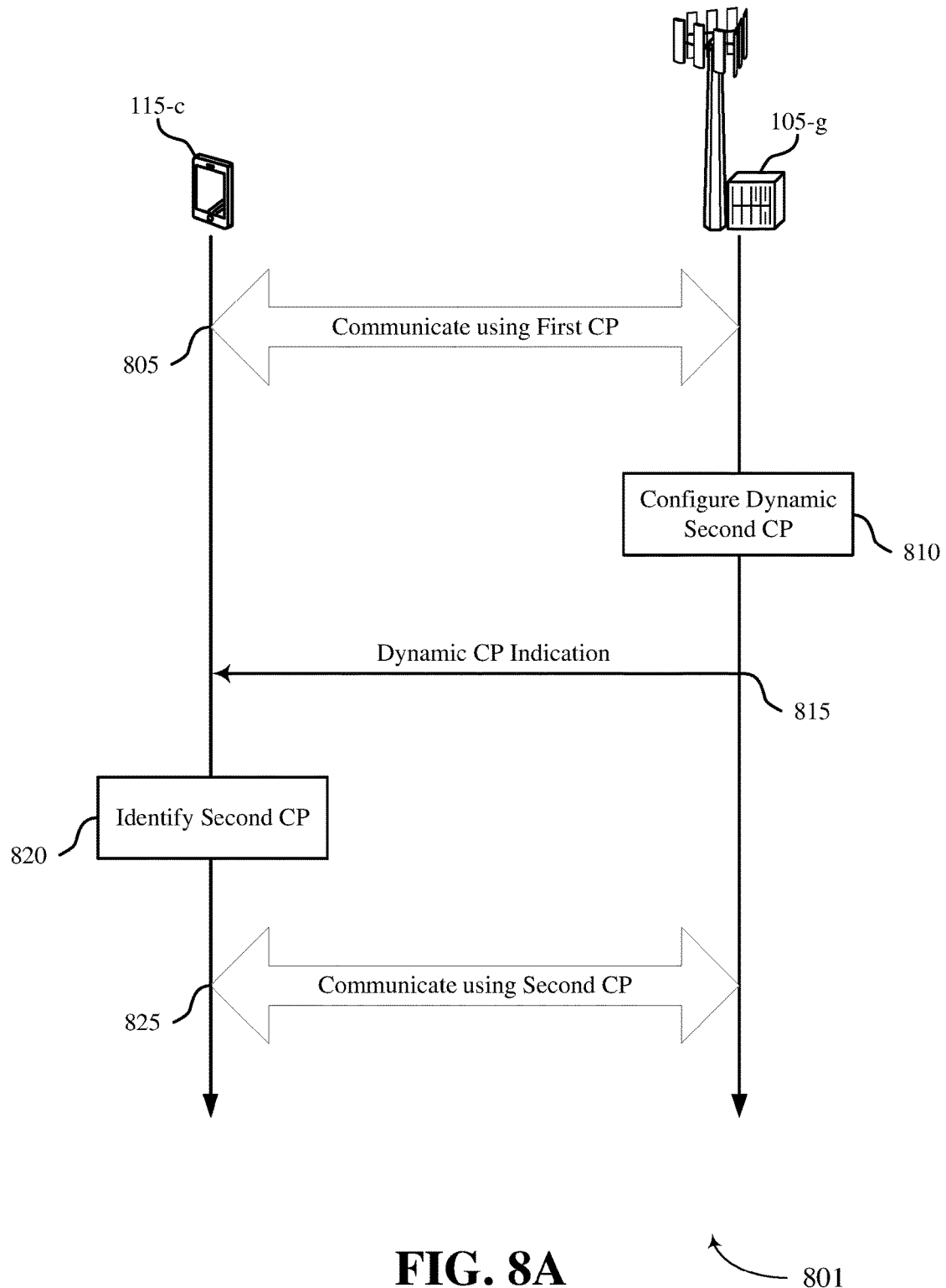
FIGS. 8A-8C illustrate examples of process flows in a system that supports dynamic CP length in accordance with aspects of the present disclosure.
Figure 8B:
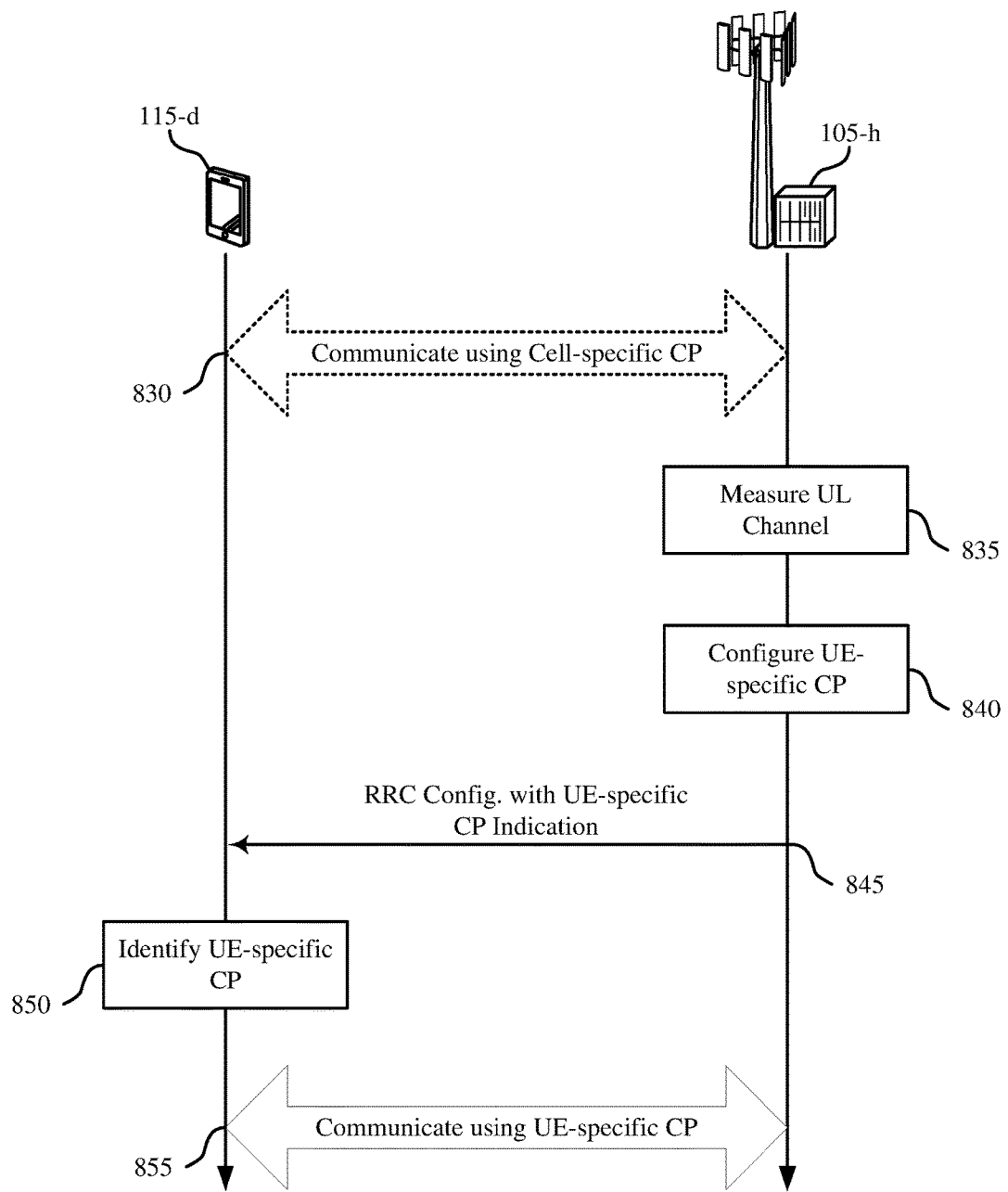
Figure 8C:
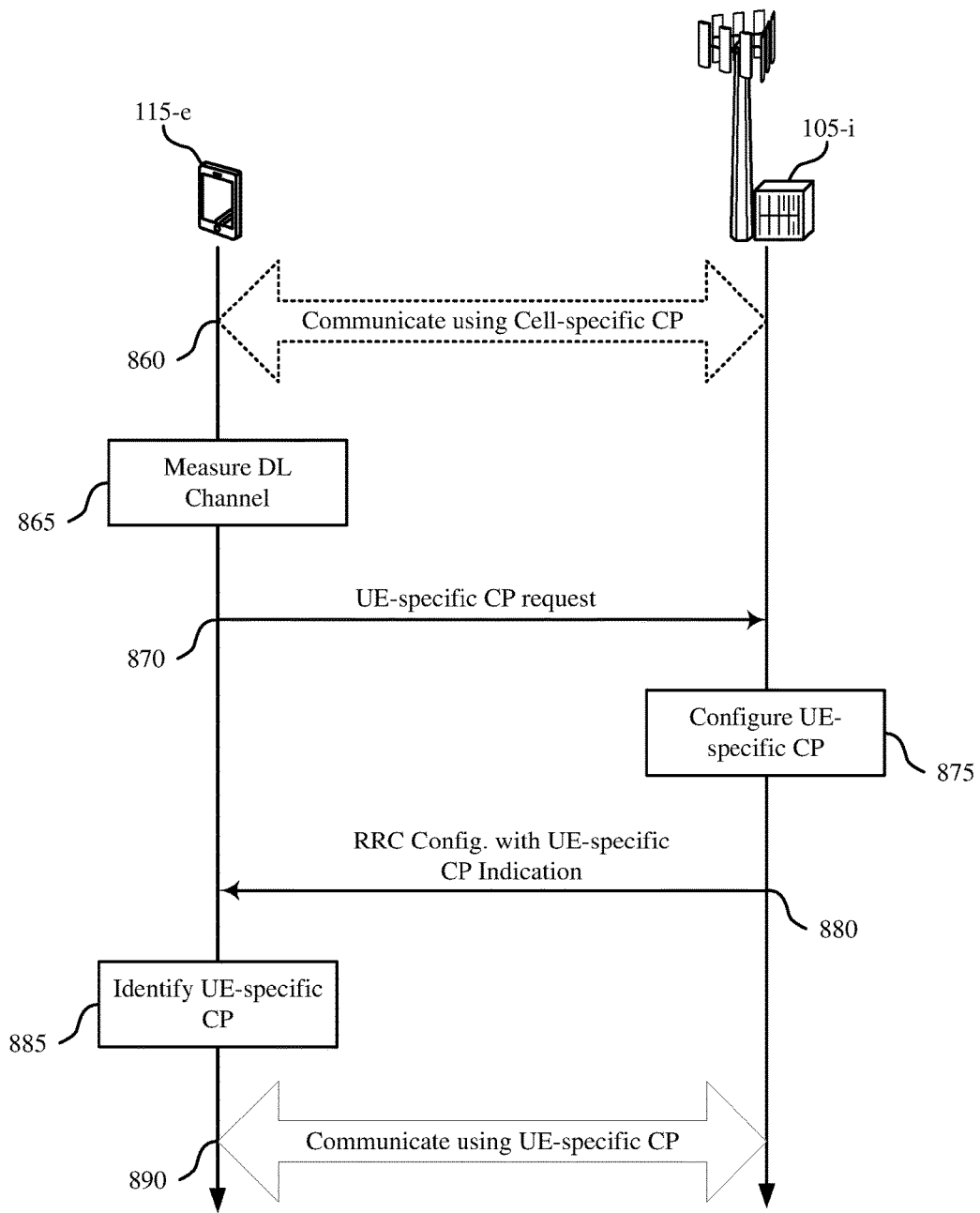

FIGS. 8A-8C illustrate examples of process flows 801-803 for utilizing dynamic CP length in accordance with various aspects of the present disclosure. Process flow 801 of FIG. 8A may be performed using a base station 105-*g* and a UE 115-*c*, which may be examples of the corresponding devices described with reference to FIG. 1-3. Both UE 115-*c* and base station 105-*g* may operate in a wireless communications system (e.g., a communications system 100) using dynamic CP lengths. While some of the operations of process flow 801 are described as performed by a UE 115-*c* or by a base station 105-*g*, the operations may be performed by either a UE 115-*c* or a base station 105-*d*. In other examples, the process flow 801 may be performed using other devices.

At block 805, a UE 115-*c* may communicate with a base station 105-*g* using a first CP length, which may include sending and receiving control channel messages and data packets. The first CP length may be cell-specific or UE-specific, and the first CP length may also be based on a cell radius of the base station 105-*g* as described in relation to FIGS. 3-7. The first CP length may be a default or normal CP length. In some cases, each data packet sent (or received) is associated with an individual dynamic CP indication.

At block 810, the base station 105-*g* may configure a dynamic second CP length for one or more UEs 115, including UE 115-*c*, which may a UE-specific CP length. In some cases, the dynamic second CP is based on a location of the UE 115-*c* relative to the base station 105-*g*. At block 815, the UE 115-*c* may receive a transmission including a dynamic CP indication. The transmission may include a control channel transmission, a PFFICH transmission, a PCFICH transmission, a PDCCH transmission, an UL grant, or a DL grant. The transmission may also include a reference signal.

In some examples, the UE 115-*c* may perform a descrambling procedure on the transmission and at block 820 may identify the second CP length based on the descrambling procedure, which recovers the second CP length from the scrambled signal. In some cases, the UE 115-*c* may perform a blind CP detection based on the dynamic second CP length or a time gap between adjacent OFDM symbols. In one example, a blind CP detection method may apply different scrambling sequences on CRS for different CP hypotheses. Another blind CP detection method may use time domain correlation. As CP is a copy of the last portion of an OFDM symbol, the UE can perform correlation between the CP and the last portion of an OFDM symbol for each of the different CP hypotheses. In this way, the UE can identify the length of the CP and/or the time gap between two consecutive CPs, based on which the UE can conclude which CP was used for the transmission.

At block 825, the UE 115-*c* may communicate with the base station 105-*g* using the dynamic second CP length based on the dynamic CP indication. The second CP length may have a longer or shorter duration than the first CP length. In some examples, communicating with the base station 105-*g* using the second CP length includes communicating on an unlicensed RF spectrum band during an LBT frame, and where the dynamic CP indication corresponds to the LBT frame.

Additionally or alternatively, communicating with the base station 105-*g* using the dynamic second CP length includes communicating using the dynamic second CP length during a transmission period of a data packet, and where the dynamic CP indication corresponds to the data packet. In some examples, communicating with the base station 105-*g* using the dynamic second CP length includes communicating using the dynamic CP length during a next subframe or a next OFDM symbol following the transmission of the CP length.

Process flow 802 of FIG. 8B may be performed by a base station 105-*h* and a UE 115-*d*, which may be examples of the corresponding devices described with reference to FIGS. 1-3. Both UE 115-*d* and base station 105-*h* may operate in a wireless communications system (e.g., wireless communications system 100) using dynamic CP lengths. While some of the operations of process flow 802 are described as performed by a UE 115-*d* or by a base station 105-*h*, the operations may be performed by either a UE 115-*d* or a base station 105-*h*.

In some cases, at block 830, the UE 115-*d* may optionally communicate with the base station 105-*h* using a first CP length, which may be a cell-specific CP length (e.g., a default CP). The communication may include sending and receiving control channel messages and data packets, and in some examples, the first CP length is based on a cell radius of the base station 105-*h* as described in relation to FIGS. 3-7.

The base station 105-*h* may perform a measurement of the UL channel at block 835, where the measurement may be used to configure a second CP length, such as a UE-specific CP. At block 840, the base station 105-*h* may then configure a UE-specific CP length for one or more UEs 115, including the UE 115-*d* based on the measurement. That is, the CP length for each of the UEs 115 may be based on an UL channel measurement for each of the UEs 115. In some cases, the base station 105-*h* may use a higher layer configuration message, such as a radio resource control (RRC) configuration message, for the UE-specific CP indication. In some examples, the base station 105-*h* may configure a semi-static and UE-specific CP length for each of a plurality of UEs, including the UE 115-*d*. A semi-static CP length does not change frequently (i.e., not every packet, TTI, or subframe). The UE-specific CP may also be based on a location of the UE 115-*d* relative to the base station 105-*h*.

At block 845, the UE 115-*d* may receive a transmission including an RRC configuration message with a UE-specific CP indication, and at block 850 may identify the UE-specific CP. For example, the UE 115-*d* may decode and/or descramble the transmission to determine the UE-specific CP indication. At block 855, the UE 115-*d* may communicate with the base station 105-*h* using the UE-specific CP length based at least in part on the UE-specific CP indication. In some examples, communicating with the base station 105-*h* using the UE-specific CP length includes communicating on an unlicensed RF spectrum band during an LBT frame, and the UE-specific CP indication may correspond to the LBT frame.

Process flow 803 may be performed by a base station 105-*i* and a UE 115-*e*, which may be examples of the corresponding devices described with reference to FIGS. 1-3. Both UE 115-*e* and base station 105-*i* may operate in a wireless communications system 100 using dynamic CP lengths. While some of the operations of process flow 803 are described as performed by a UE 115-*e* or by a base station 105-*i*, the operations may be performed by either the UE 115-*e* or the base station 105-*i*.

At block 860, the UE 115-*e* may communicate with the base station 105-*i* using a first CP length, which may be a cell-specific CP length. In some cases, the first CP length is based on a cell radius of the base station 105-*i* as described in relation to FIGS. 3-7. At block 865, the UE 115-*e* may perform a measurement on the DL channel. For example, the measurement may be a delay spread of the DL channel. The UE 115-*e* may then transmit a UE-specific CP request to the base station 105-*i* at step 870 based on the measurement. A UE-specific CP length may be configured based on the UE-specific CP length request, and the UE-specific CP length request may be based on the DL channel measurement. That is, the UE 115-*e* may measure channel conditions (e.g., ISI, delay spread) and send a request to switch to a UE-specific CP length based on the DL channel measurement. In some examples, the UE 115-*e* may also indicate in a CP request that it is capable of using dynamic or UE-specific CP lengths for communication.

At block 875, the base station 105-*i* may configure a UE-specific CP length for one or more UEs 115, including the UE 115-*e*. In some cases, the base station 105-*i* may configure a semi-static UE-specific CP length for each of a plurality of UEs, including the UE 115-*e*. A semi-static UE-specific CP length may be updated but not frequently (i.e., not pre-packet). At block 880, the UE 115-*e* may receive a transmission including the UE-specific CP indication (e.g., transmitted using an RRC configuration message).

At block 885, the UE 115-*e* may identify the UE-specific CP length indicated by the base station 105-*i*. For example, the UE 115-*e* may decode and/or descramble the transmission to determine the UE-specific CP indication. At block 890, the UE 115-*e* may communicate with the base station 105-*i* using the UE-specific CP length based at least in part on the UE-specific CP indication. In some examples, communicating with the base station 105-*i* using the UE-specific CP length includes communicating on an unlicensed RF spectrum band during an LBT frame, and where the UE-specific CP indication corresponds to the LBT frame.

Figure 9:
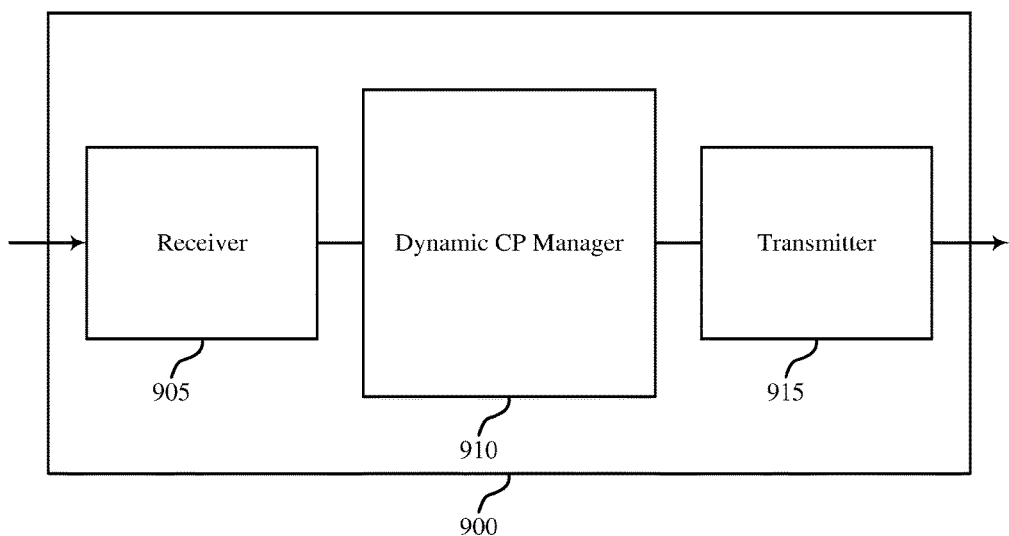
FIGS. 9 through 11 show block diagrams of a wireless device that supports dynamic CP length in accordance with aspects of the present disclosure.

FIG. 9 shows a block diagram of a wireless device 900 that supports dynamic CP length in accordance with various aspects of the present disclosure. The wireless device 900 may be an example of aspects of a UE 115 or a base station 105 as described with reference to FIGS. 1 and 3. The wireless device 800 may include a receiver 905, a dynamic CP manager 910 and a transmitter 915. The wireless device 900 may also include a processor (not shown). Each of these components may be in communication with each other. The wireless device 900 may be configured to perform some aspects of the processes described in relation to FIGS. 8A-8C.

The receiver 905 may receive information such as packets, user data, or control information associated with various information channels (e.g., control channels, data channels, and information related to dynamic CP length, etc.). The received information may be passed on to other components of the device 900. The receiver 905 may be an example of aspects of the transceiver 1225 described with reference to FIG. 12.

The dynamic CP manager 910 may communicate with a wireless device using a first CP length, receive a transmission including a dynamic CP indication, and communicate with the wireless device using a second CP length based on the dynamic CP indication. In some cases, the dynamic CP manager 910 in coordination with the receiver 905 may receive an indication of the capabilities of a UE 115, such as the capability to communicate using dynamic CP lengths, or an indication that a UE 115 is requesting a different length CP. The dynamic CP manager 910 may also receive channel measurement information from a UE 115. The dynamic CP manager 910 may also be an example of aspects of the dynamic CP manager 1205 described with reference to FIG. 12.

The transmitter 915 may transmit signals received from or generated by other components of the wireless device 900. In some examples, the transmitter 915 may be collocated with a receiver in a transceiver module. For example, the transmitter 915 may be an example of aspects of the transceiver 1225 described with reference to FIG. 12. The transmitter 915 may include a single antenna, or it may include a plurality of antennas.

Figure 10:
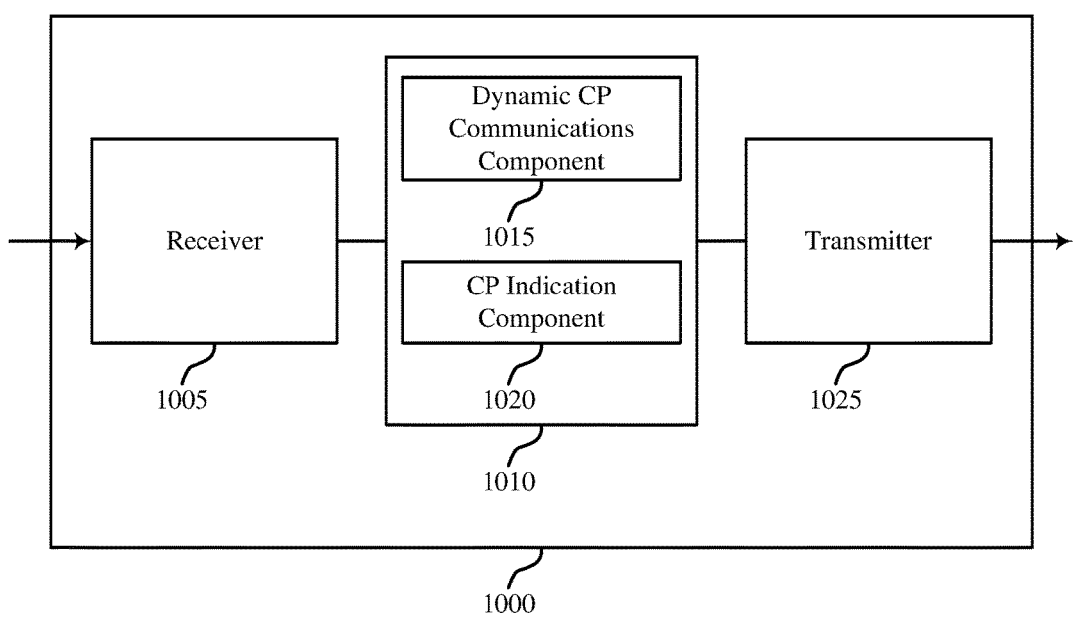

FIG. 10 shows a block diagram of a wireless device 1000 that supports dynamic CP length in accordance with various aspects of the present disclosure. The wireless device 1000 may be an example of aspects of a wireless device 900 or a UE 115 or a base station 105 described with reference to FIGS. 1, 2, and 9. The wireless device 1000 may include a receiver 1005, a dynamic CP manager 1010 and a transmitter 1025. The wireless device 1000 may also include a processor (not shown). Each of these components may be in communication with each other.

The receiver 1005 may receive information which may be passed on to other components of the device 1000. The receiver 1005 may also perform the functions described with reference to the receiver 905 of FIG. 9. The receiver 1005 may be an example of aspects of the transceiver 1225 described with reference to FIG. 12.

The dynamic CP manager 1010 may be an example of aspects of the dynamic CP manager 910 described with reference to FIG. 9. The dynamic CP manager 1010 may include dynamic CP communications component 1015 and CP indication component 1020. The dynamic CP manager 1010 may be an example of aspects of the dynamic CP manager 1205 described with reference to FIG. 12.

The dynamic CP communications component 1015 may communicate with a wireless device using a first CP length, and communicate with the wireless device using a second CP length based on the dynamic CP indication. In some cases, communicating with the wireless device using the second CP length includes: communicating using the second CP length during a transmission period of a data packet, and where the dynamic CP indication corresponds to the data packet. In some cases, each data packet communicated with the wireless device is associated with an individual dynamic CP indication. In some cases, the first CP length is based on a cell radius of a base station, and the second CP is based on a location of the wireless device relative to the base station.

In some cases, communicating with the wireless device using the second CP length includes: communicating using the second CP length during a next subframe or a next orthogonal frequency division multiplexing (OFDM) symbol following the transmission of a CP indication. In some cases, the CP length for each of the set of UEs is based on an UL channel measurement for each of the set of UEs.

The CP indication component 1020 may receive an indication of the first CP length, where the first CP length includes a default CP length, and receive a transmission including a dynamic CP indication that may indicate a second CP length. In some cases, the transmission includes a control channel transmission, a frame format indicator channel (PFFICH) transmission, a PCFICH transmission, a PDCCH transmission, an UL grant, or a DL grant. In some cases, the transmission includes a reference signal. The dynamic CP indication may be determined by decoding and/or descrambling any of these signals or transmissions.

The transmitter 1025 may transmit signals received from or generated by other components of the wireless device 1000. In some examples, the transmitter 1025 may be collocated with a receiver in a transceiver module. For example, the transmitter 1025 may be an example of aspects of the transceiver 1225 described with reference to FIG. 12. The transmitter 1025 may utilize a single antenna, or it may utilize a plurality of antennas.

Figure 11:
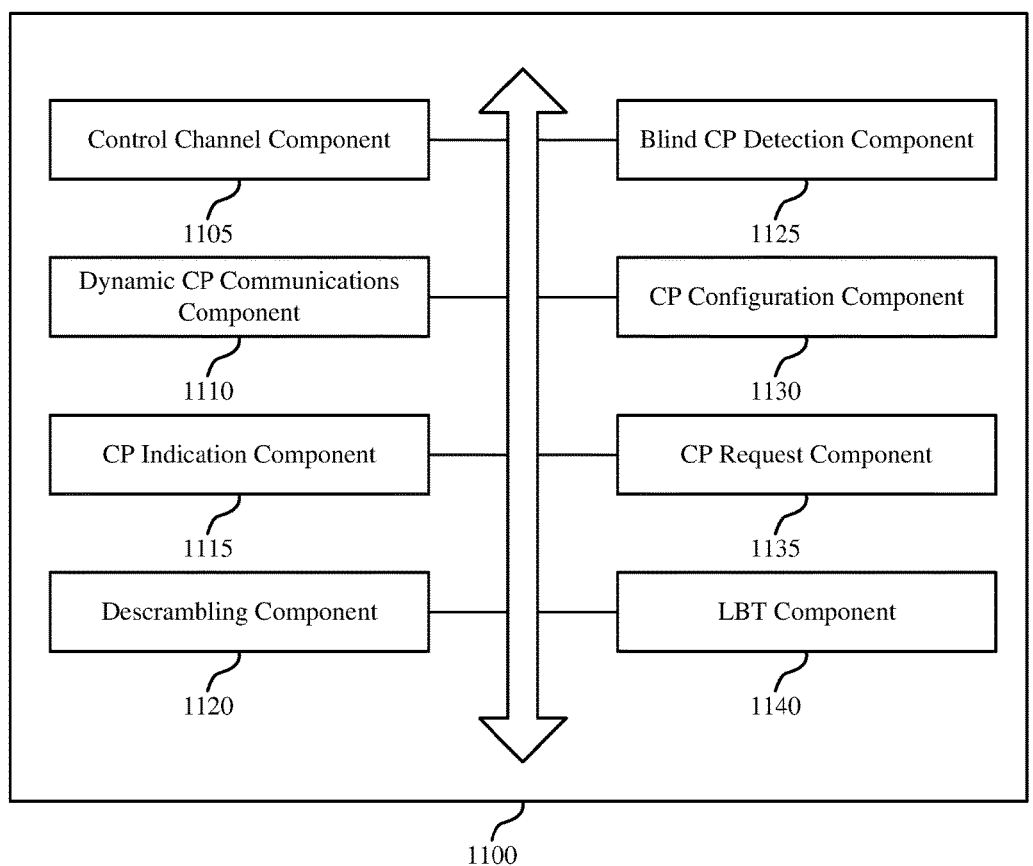

FIG. 11 shows a block diagram of a dynamic CP manager 1100 which may be an example of the corresponding component of the wireless device 900 or wireless device 1000. That is, the dynamic CP manager 1100 may be an example of aspects of the dynamic CP manager 910 or dynamic CP manager 1010 described with reference to FIGS. 9 and 10.

The dynamic CP manager 1100 may also be an example of aspects of the dynamic CP manager 1205 described with reference to FIG. 12.

The dynamic CP manager 1100 may include control channel component 1105, dynamic CP communications component 1110, CP indication component 1115, descrambling component 1120, blind CP detection component 1125, CP configuration component 1130, CP request component 1135, and LBT component 1140. Each of these modules may communicate, directly or indirectly, with one another (e.g., via one or more buses). In various aspects of the disclosure, the dynamic CP manager 1100 may include other additional components not shown in FIG. 11, and may not include some of the components shown in FIG. 11.

The control channel component 1105 may receive a control channel message for a data packet. The dynamic CP communications component 1110 may communicate with a wireless device using a first CP length, and communicate with the wireless device using a second CP length based on a dynamic CP indication.

The CP indication component 1115 may receive an indication of the first CP length, where the first CP length may include a default CP length, and receive a transmission including a dynamic CP indication. The descrambling component 1120 may perform a descrambling and/or decoding procedure on the transmission, and identify the second CP length based on the descrambling and/or decoding procedure.

The blind CP detection component 1125 may perform a blind CP detection based on the second CP length, a time gap between adjacent OFDM symbols, or other methods for detecting an unknown CP. The CP configuration component 1130 may configure a dynamic CP length for each of a set of UEs or wireless devices, where the wireless device includes one of the set of UEs. In some examples, the CP configuration component 1130 may configure a semi-static CP length for each of a set of UEs, where the wireless device includes one of the set of UEs.

The CP request component 1135 may transmit a CP length request to a base station, where the second CP length may be based on the CP length request. In some cases, the CP length request may be based on a DL channel measurement or other channel measurements. The LBT component 1140 may perform an LBT procedure such as a CCA and facilitate communication on an unlicensed RF spectrum band during an LBT frame, and where the dynamic CP indication corresponds to the LBT frame.

Figure 12:
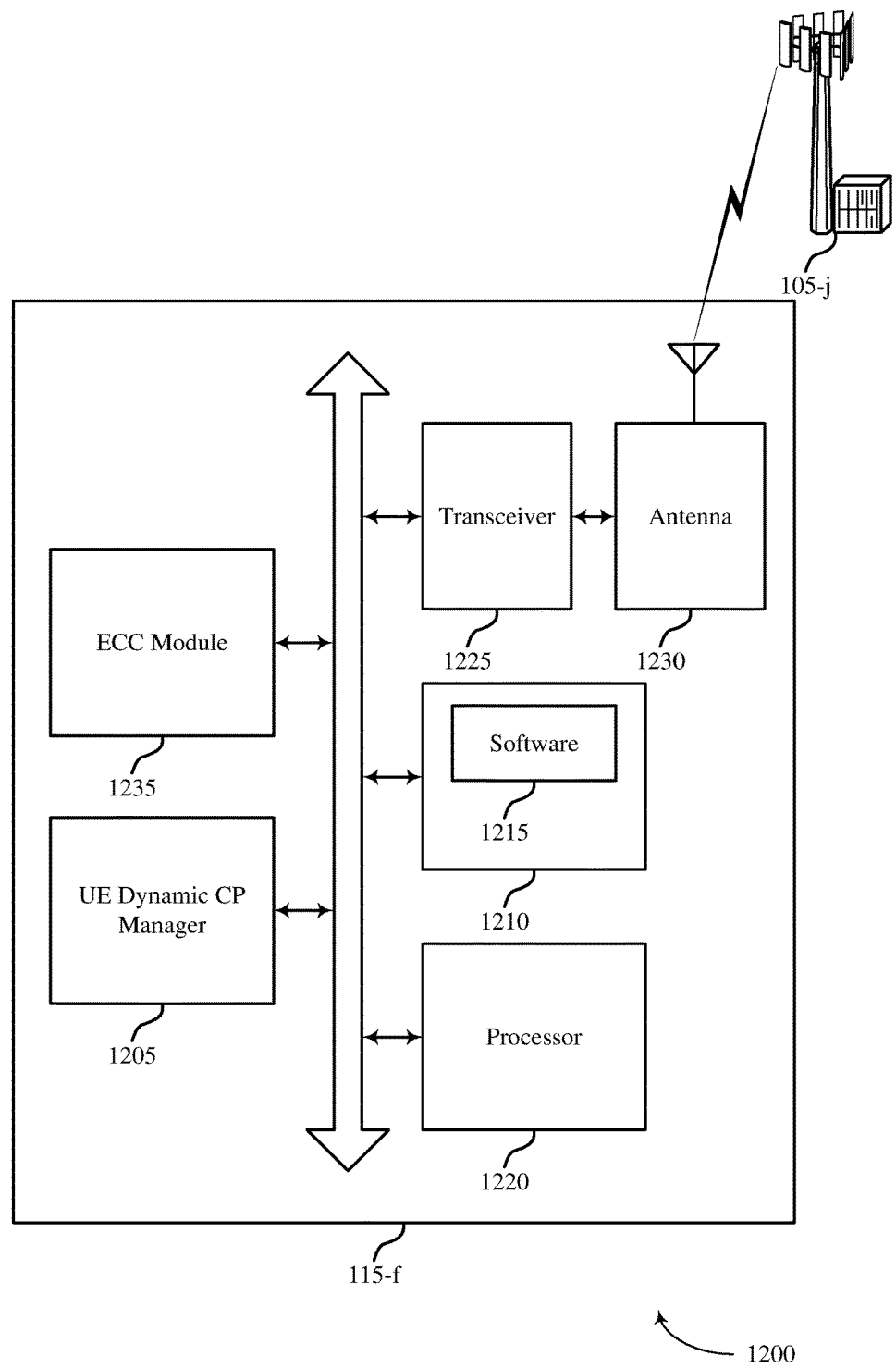
FIG. 12 illustrates a block diagram of a system including a user equipment that supports dynamic CP length in accordance with aspects of the present disclosure.

FIG. 12 shows a diagram of a system 1200 including a device that supports a dynamic CP length in accordance with various aspects of the present disclosure. For example, the system 1200 may include a UE 115-*f* (a wireless device), which may be an example of a wireless device 900, a wireless device 1000, or a UE 115 as described with reference to FIGS. 1, 2, and 9 through 11.

The UE 115-*f* may also include a UE dynamic CP manager 1205, a memory 1210, a processor 1220, a transceiver 1225, one or more antennas 1230, and an ECC module 1235. Each of these modules may communicate, directly or indirectly, with one another (e.g., via one or more buses). The UE 115-*f* may also include other components not shown in FIG. 12. In some aspects of the disclosure, the UE 115-*f* may include some or all of the components shown in FIG. 12. The UE dynamic CP manager 1205 may be an example of a UE dynamic CP manager as described with reference to FIGS. 9 through 11.

The memory 1210 may include random access memory (RAM) and read only memory (ROM), and/or a non-transitory computer-readable storage medium. The memory 1210 may store computer-readable, computer-executable software including instructions or code that, when executed, cause the UE (e.g., processor 1220) to perform various functions described herein (e.g., dynamic CP length, etc.). In some cases, the software 1215 may not be directly executable by the processor but may cause a computer (e.g., when compiled and executed) to perform functions described herein. The processor 1220 may include an intelligent hardware device, (e.g., a central processing unit (CPU), a microcontroller, an application specific integrated circuit (ASIC), etc.) for preforming the various functions and processes described herein.

The transceiver 1225 may communicate bi-directionally, via one or more antennas, wired, or wireless links, with one or more networks or wireless devices, as described above. For example, the transceiver 1225 may communicate bi-directionally with a base station 105 or a UE 115. The transceiver 1225 may also include a modem to modulate the packets and provide the modulated packets to the antennas 1230 for transmission, and to demodulate packets received from the antennas 1230. In some cases, the UE 115-*f* may include a single antenna 1230. However, in some cases the device may have more than one antenna 1230, which may be capable of concurrently transmitting or receiving multiple wireless transmissions (e.g., multiple-input multiple-output (MIMO) transmissions). The ECC module 1235 may enable operations using enhanced component carriers (ECCs) such as communication using shared or unlicensed spectrum, using reduced TTIs or subframe durations, or using a large number of component carriers (e.g., carrier aggregation).

Figure 13:
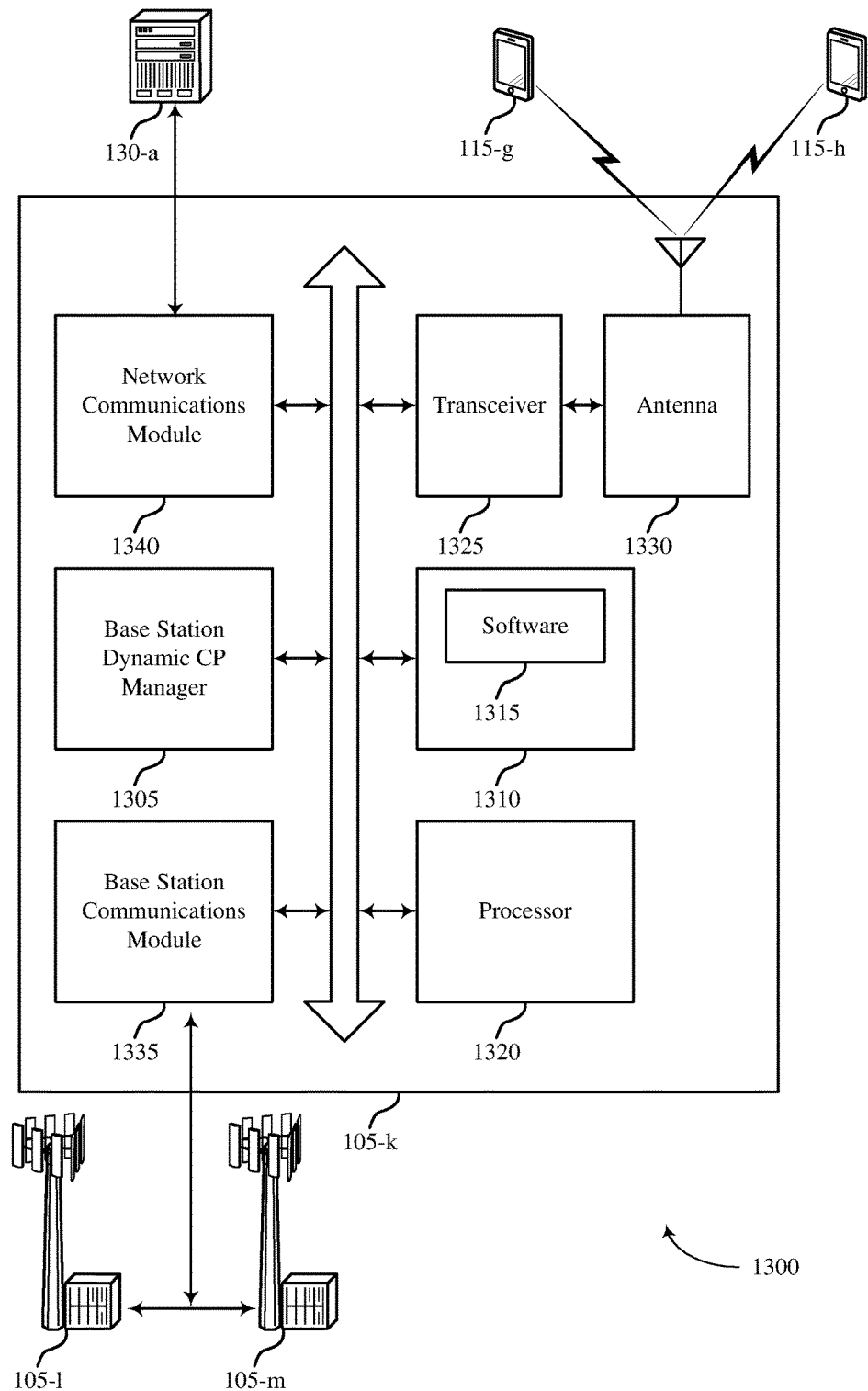
FIG. 13 illustrates a block diagram of a system including a base station that supports dynamic CP length in accordance with aspects of the present disclosure.

FIG. 13 shows a diagram of a wireless system 1300 including a wireless device configured to support a dynamic CP length in accordance with various aspects of the present disclosure. For example, the system 1300 may include a base station 105-*k*, which may be an example of a wireless device 900, a wireless device 1000, or a base station 105 as described with reference to FIGS. 1, 2, and 9 through 11. The base station 105-*k* may also include components for bi-directional voice and data communications including components for transmitting communications and components for receiving communications. For example, the base station 105-*k* may communicate bi-directionally with one or more UEs 115 (e.g., UE 115-*g* and UE 115-*h*).

The base station 105-*k* may also include a base station dynamic CP manager 1305, a memory 1310, a processor 1320, a transceiver 1325, one or more antennas 1330, a base station communications module 1335, and a network communications module 1340. Each of these modules may communicate, directly or indirectly, with one another (e.g., via one or more buses). The base station dynamic CP manager 1305 may be an example of a base station dynamic CP manager as described with reference to FIGS. 9 through 11. The base station 105-*k* may also include other components not shown in FIG. 13. In some aspects of the disclosure, the base station 105-*k* may include some or all of the components shown in FIG. 13.

The memory 1310 may include RAM, ROM, and/or a non-transitory computer-readable medium. The memory 1310 may store computer-readable, computer-executable software including instructions or code that, when executed, cause the base station 105-*k* (e.g., a processor 1320) to perform various functions described herein (e.g., communicating using a dynamic CP length, sending or receiving a dynamic CP indicator, etc.). In some cases, the software 1315 may not be directly executable by the processor 1320 but may cause a computer (e.g., when compiled and executed) to perform functions described herein. The processor 1320 may include an intelligent or configurable hardware device, (e.g., a CPU, a microcontroller, an ASIC, etc.)

The transceiver 1325 may communicate bi-directionally, via one or more antennas 1330, wired, or wireless links, with one or more networks or wireless devices, as described above. For example, the transceiver 1325 may communicate bi-directionally with a base station 105 or a UE 115. The transceiver 1325 may also include a modem to modulate the packets and provide the modulated packets to the antennas for transmission, and to demodulate packets received from the antennas. In some cases, the wireless device 105-$k$ may include a single antenna 1330. However, in some cases, the device may have more than one antenna 1330, which may be capable of concurrently transmitting or receiving multiple wireless transmissions (e.g., MIMO transmissions).

The base station communications module 1335 may manage communications with other base stations 105 (e.g., base stations 105-1 and 105-$m$), and may include a controller or scheduler for controlling communications with UEs 115 in cooperation with other base stations 105. For example, the base station communications module 1335 may coordinate scheduling for transmissions to UEs 115 for various interference mitigation techniques such as beamforming or joint transmission. In some examples, the base station communications module 1335 may provide an X2 interface within an LTE/LTE-A wireless communication network technology to provide communication between base stations 105.

The network communications module 1340 may manage communications with a core network (e.g., via one or more wired or wireless backhaul links). For example, the network communications module 1340 may manage the transfer of data communications for client devices, such as one or more UEs 115.

Figure 14:
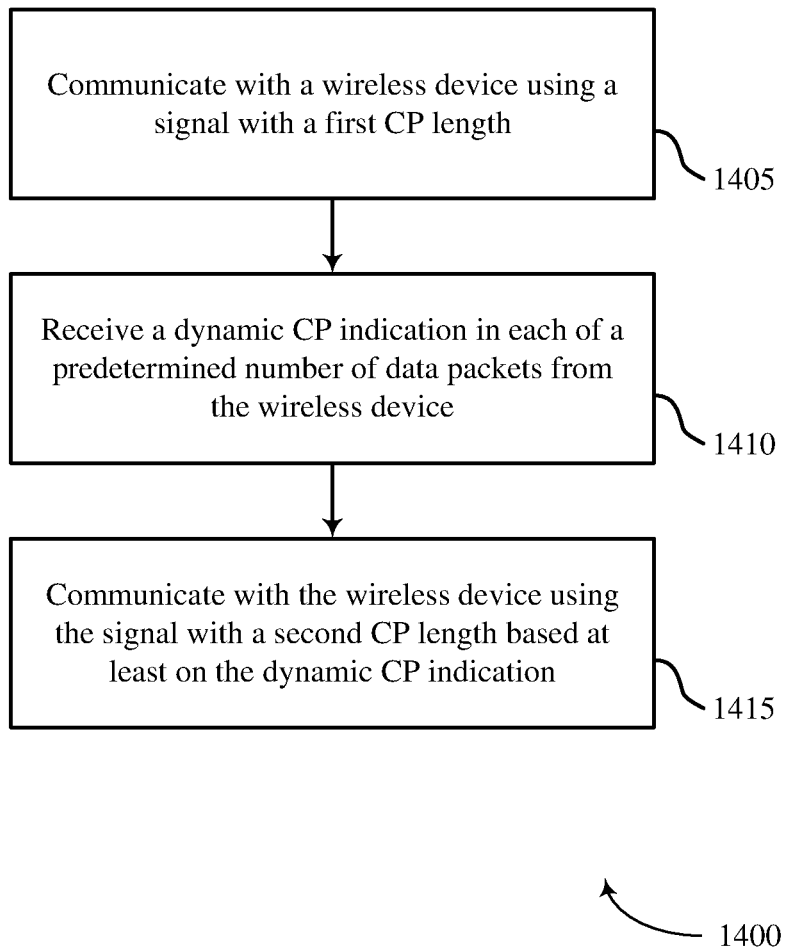
FIGS. 14 through 17 illustrate methods for wireless communication using dynamic CP length in accordance with aspects of the present disclosure.

FIG. 14 shows a flowchart illustrating a method 1400 for dynamic CP length in accordance with various aspects of the present disclosure. The operations of method 1400 may be implemented by a device such as a UE 115 or a base station 105 or its components as described with reference to any of FIGS. 1, 3, and 9-13. For example, the operations of method 1400 may be performed by the dynamic CP manager as described herein, for example, with reference to any of FIGS. 9-13. In some examples, the UE 115 or base station 105 may execute a set of codes (e.g., software 1215 of FIG. 12 or software 1315 of FIG. 13) to control the functional elements of the device to perform the functions described below. Additionally or alternatively, the UE 115 or base station 105 may perform aspects of the functions described below using special-purpose hardware.

At block 1405, the UE 115 or base station 105 may communicate with a wireless device using a signal with a first CP length as described above with reference to FIGS. 3 through 8. For example, the wireless device may be a UE or base station. In certain examples, the operations of block 1405 may be performed by the dynamic CP communications component as described with reference to FIGS. 10 and 11.

At block 1410, the UE 115 or base station 105 may receive a transmission including a dynamic CP indication as described above with reference to FIGS. 3 through 8. For example, the dynamic CP indication may be included in each of a predetermined number of data packets. In one example, the dynamic CP indication may be included in each data packet. In certain examples, the operations of block 1410 may be performed by the CP indication component as described with reference to FIGS. 10 and 11.

At block 1415, the UE 115 or base station 105 may communicate with the wireless device using a second CP length based on the dynamic CP indication as described above with reference to FIGS. 2 through 7. The second CP length may be based at least in part on a signal condition (e.g., delay spread), ISI, or a data direction (e.g., UL or DL) of the signal. In certain examples, the operations of block 1415 may be performed by the dynamic CP communications component as described with reference to FIGS. 10 and 11.

Figure 15:
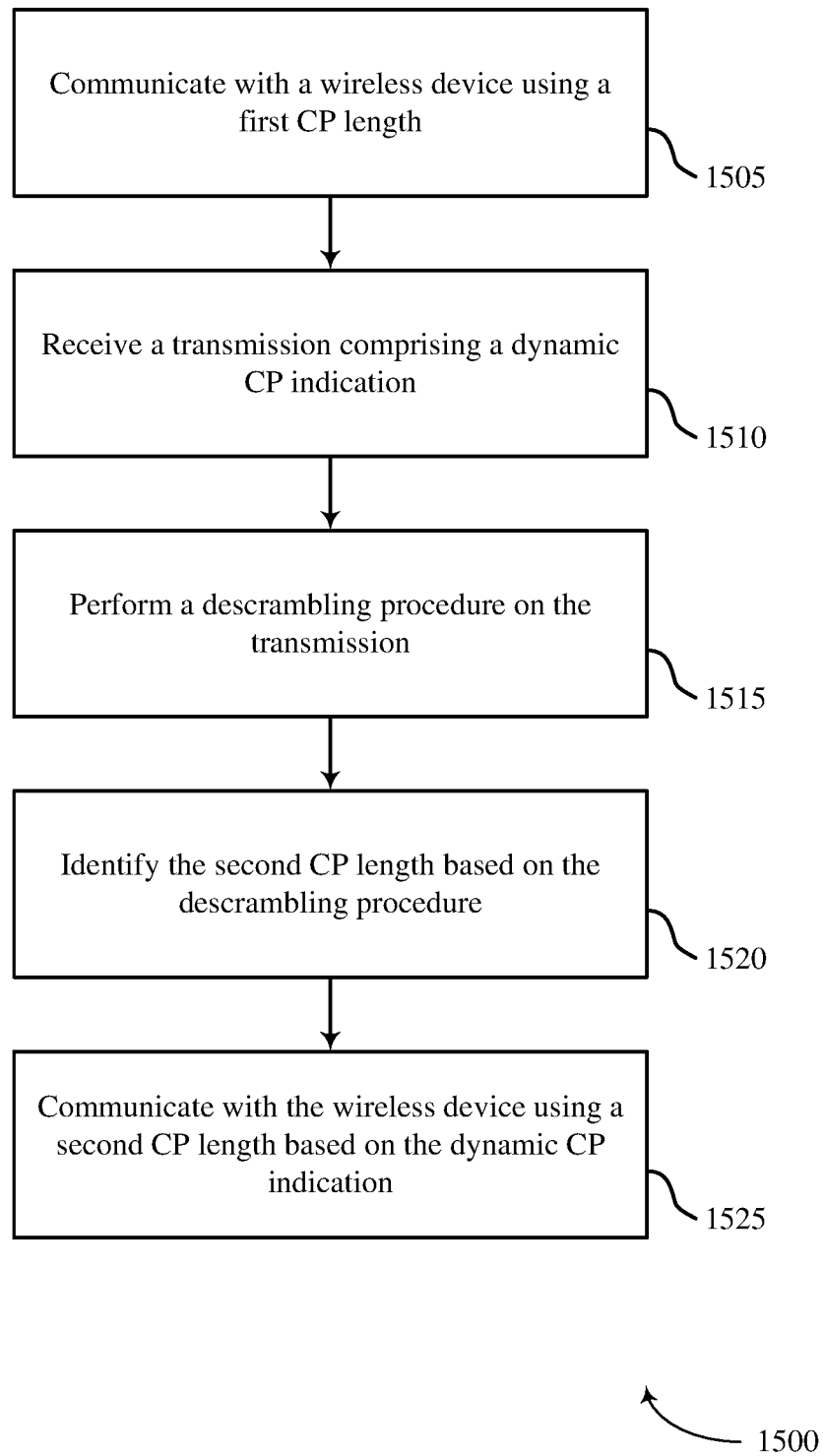

FIG. 15 shows a flowchart illustrating a method 1500 for a dynamic CP length in accordance with various aspects of the present disclosure. The operations of method 1500 may be implemented by a device such as a UE 115 or a base station 105 or its components as described with reference to FIGS. 1 and 3. For example, the operations of method 1500 may be performed by the dynamic CP manager as described herein. In some examples, the UE 115 or base station 105 may execute software or a set of codes to control the functional elements of the device to perform the functions described below. Additionally or alternatively, the UE 115 or base station 105 may perform aspects of the functions described below using special-purpose hardware.

At block 1505, the UE 115 or base station 105 may communicate with a wireless device using a first CP length as described above with reference to FIGS. 3 through 8. For example, the wireless device may be a UE or base station. In certain examples, the operations of block 1505 may be performed by the dynamic CP communications component as described with reference to FIGS. 10 and 11.

At block 1510, the UE 115 or base station 105 may receive a transmission including a dynamic CP indication as described above with reference to FIGS. 3 through 8. In certain examples, the operations of block 1510 may be performed by the CP indication component as described with reference to FIGS. 10 and 11.

At block 1515, the UE 115 or base station 105 may perform a descrambling procedure on the transmission as described above with reference to FIGS. 3 through 8. In certain examples, the operations of block 1515 may be performed by the descrambling component as described with reference to FIGS. 10 and 11.

At block 1520, the UE 115 or base station 105 may identify the second CP length based on the descrambling procedure as described above with reference to FIGS. 3 through 8. In certain examples, the operations of block 1520 may be performed by the descrambling component as described with reference to FIGS. 10 and 11.

At block 1525, the UE 115 or base station 105 may communicate with the wireless device using a second CP length based on the dynamic CP indication as described above with reference to FIGS. 3 through 8. In certain examples, the operations of block 1525 may be performed by the dynamic CP communications component as described with reference to FIGS. 10 and 11.

Figure 16:
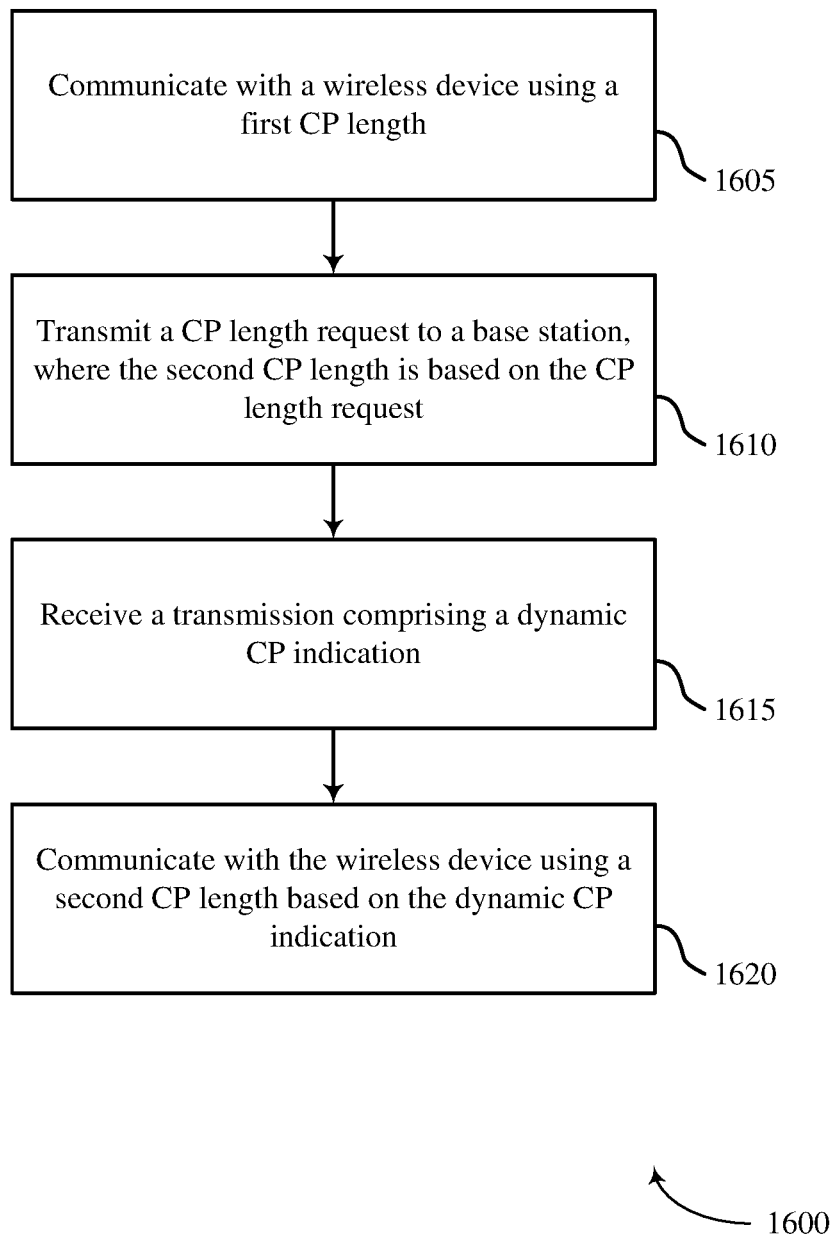

FIG. 16 shows a flowchart illustrating a method 1600 for a dynamic CP length in accordance with various aspects of the present disclosure. The operations of method 1600 may be implemented by a device such as a UE 115 or its components as described with reference to FIGS. 1 and 3. For example, the operations of method 1600 may be performed by the dynamic CP manager as described herein. In some examples, the UE 115 may execute software or a set of codes to control the functional elements of the device to perform the functions described below. Additionally or alternatively, the UE 115 may perform aspects of the functions described below using special-purpose hardware.

At block 1605, the UE 115 may communicate with a wireless device using a first CP length as described above with reference to FIGS. 3 through 8. For example, the wireless device may be a base station or UE. In certain examples, the operations of block 1605 may be performed by the dynamic CP communications component as described with reference to FIGS. 10 and 11.

At block 1610, the UE 115 may transmit a CP length request to a base station, where the second CP length is based on the CP length request as described above with reference to FIGS. 3 through 8. In some examples, the base station may be the same as the wireless device of block 1605. In certain examples, the operations of block 1610 may be performed by the CP request component as described with reference to FIGS. 10 and 11.

At block 1615, the UE 115 may receive a transmission including a dynamic CP indication as described above with reference to FIGS. 3 through 8. The UE 115 may receive the dynamic CP indication from a base station. In certain examples, the operations of block 1615 may be performed by the CP indication component as described with reference to FIGS. 10 and 11.

At block 1620, the UE 115 may communicate with the wireless device using a second CP length based on the dynamic CP indication as described above with reference to FIGS. 3 through 8. In certain examples, the operations of block 1620 may be performed by the dynamic CP communications component as described with reference to FIGS. 10 and 11.

Figure 17:
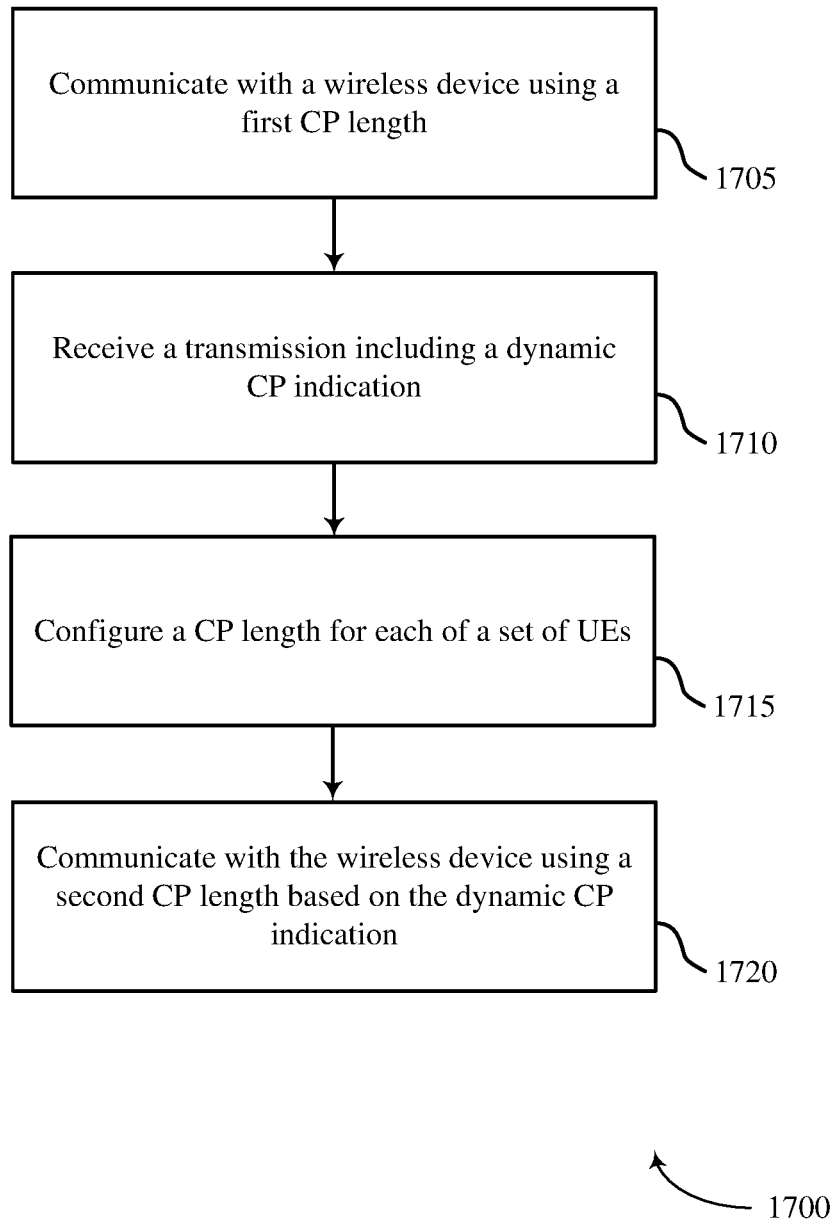

FIG. 17 shows a flowchart illustrating a method 1700 for a dynamic CP length in accordance with various aspects of the present disclosure. The operations of method 1700 may be implemented by a device such as a base station 105 or its components as described with reference to FIGS. 1 and 3. For example, the operations of method 1700 may be performed by the dynamic CP manager as described herein. In some examples, the base station 105 may execute software or a set of codes to control the functional elements of the device to perform the functions described below. Additionally or alternatively, the base station 105 may perform aspects of the functions described below using special-purpose hardware.

At block 1705, the base station 105 may communicate with a wireless device using a first CP length as described above with reference to FIGS. 3 through 8. The wireless device may be a UE 115. In certain examples, the operations of block 1705 may be performed by the dynamic CP communications component as described with reference to FIGS. 9 and 10.

At block 1710, the base station 105 may receive a transmission including a dynamic CP indication as described above with reference to FIGS. 3 through 8. In some examples, the dynamic CP indication may include an indication that a UE 115 is capable of communicating using a second or different CP length, or that the wireless device is requesting a different CP length. Additionally or alternatively, the transmission may indicate channel quality or an indication of inter symbol interference at the UE 115. In certain examples, the operations of block 1710 may be performed by the CP indication component as described with reference to FIGS. 10 and 11.

At block 1715, the base station 105 may configure a CP length for each of a set of UEs. The wireless device may be one of the set of UEs as described above with reference to FIGS. 3 through 8. In certain examples, the operations of block 1715 may be performed by the CP configuration component as described with reference to FIGS. 10 and 11.

At block 1720, the base station 105 may communicate with the wireless device using a second CP length based on the dynamic CP indication as described above with reference to FIGS. 3 through 8. In certain examples, the operations of block 1720 may be performed by the dynamic CP communications component as described with reference to FIGS. 10 and 11.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for dynamic CP length.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different PHY locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 300 of FIGS. 1 and 3 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for dynamic CP length. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication comprising:
communicating with a wireless device using a signal with a first cyclic prefix (CP) length;
receiving a CP length request from the wireless device;
configuring a second CP length specific for each of a plurality of user equipment (UEs) including the wireless device, wherein the second CP length for the wireless device is based at least in part on the CP length request;
transmitting a plurality of data packets to the wireless device, each of the data packets comprising a dynamic CP indication that indicates the second CP length; and
communicating with the wireless device using the signal with the second CP length specific to the wireless device based at least in part on the dynamic CP indication.

2. The method of claim 1,
wherein each of the data packets comprises an individual dynamic CP indication specific to the wireless device.

3. The method of claim 1, wherein the CP length request is based at least in part on a downlink channel measurement.

4. The method of claim 1, further comprising:
configuring a semi-static CP length for each of the plurality of UEs.

5. The method of claim 1, wherein the transmitting the plurality of data packets comprises:
transmitting the dynamic CP indication explicitly in control signals.

6. The method of claim 1, wherein the transmitting the plurality of data packets comprises:
transmitting the dynamic CP indication implicitly using cell-specific reference signal (CRS) scrambling, control channel scrambling, or a subframe number.

7. The method of claim 1, wherein the second CP length is further based on an uplink channel measurement for the wireless device.

8. An apparatus for wireless communication comprising:
means for communicating with a wireless device using a signal with a first cyclic prefix (CP) length;
means for receiving a CP length request from the wireless device;
means for configuring a second CP length specific for each of a plurality of user equipment (UEs) including the wireless device, wherein the second CP length for the wireless device is based at least in part on the CP length request;
means for transmitting a plurality of data packets to the wireless device, each of the data ackets comprising a dynamic CP indication that indicates the second CP length; and
means for communicating with the wireless device using the signal with the second CP length specific to the wireless device based at least in part on the dynamic CP indication.

9. The apparatus of claim 8,
wherein each of the data packets comprises an individual dynamic CP indication specific to the wireless device.

10. The apparatus of claim 8, wherein the CP length request is based at least in part on a downlink channel measurement.

11. The apparatus of claim 8, further comprising:
means for configuring a semi-static CP length for each of the plurality of UEs.

12. The apparatus of claim 8, wherein the second CP length is further based on an uplink channel measurement for the wireless device.

13. An apparatus for wireless communication, comprising:
a processor;
a memory in communication with the processor; and
instructions stored in the memory and operable, when executed by the processor, configured to cause the processor to:
communicate with a wireless device using a signal with a first cyclic prefix (CP) length;
receive a CP length request from the wireless device;
configure a second CP length specific for each of a plurality of user equipment (UEs) including the wireless device, wherein the second CP length for the wireless device is based at least in part on the CP length request;
transmit a plurality of data packets to the wireless device, each of the data packets comprising a dynamic CP indication that indicates the second CP length; and
communicate with the wireless device using the signal with the second CP length specific to the wireless device based at least in part on the dynamic CP indication.

14. The apparatus of claim 13,
wherein each of the data packets comprises an individual dynamic CP indication specific to the wireless device.

15. The apparatus of claim 13, wherein the CP length request is based at least in part on a downlink channel measurement.

16. The apparatus of claim 13, wherein the instructions are operable to cause the processor to:
configure a semi-static CP length for each of the plurality of UEs.

17. The apparatus of claim 13, wherein the second CP length is further based on an uplink channel measurement for the wireless device.

18. A non-transitory computer-readable medium storing code for wireless communication, the code comprising instructions executable to:
communicate with a wireless device using a signal with a first cyclic prefix (CP) length;
receiving a CP length request from the wireless device;
configure a second CP length specific for each of a plurality of user equipment (UEs) including the wireless device, wherein the second CP length for the wireless device is based at least in part on the CP length request;
transmit a plurality of data packets to the wireless device, each of the data packets comprising a dynamic CP indication that indicates the second CP length; and
communicate with the wireless device using the signal with the second CP length based at least in part on the dynamic CP indication.

19. The non-transitory computer-readable medium of claim 18,
wherein each of the data packets comprises an individual dynamic CP indication specific to the wireless device.

20. The non-transitory computer-readable medium of claim 18, wherein the CP length request is based at least in part on a downlink channel measurement.

21. The non-transitory computer-readable medium of claim 18, wherein the instructions are executable to:
configure a semi-static CP length for each of the plurality of UEs.

22. The non-transitory computer-readable medium of claim 18, wherein the second CP length is further based on an uplink channel measurement for the wireless device.

* * * * *